US010294776B2

(12) United States Patent
Rempe et al.

(10) Patent No.: US 10,294,776 B2
(45) Date of Patent: May 21, 2019

(54) HORIZONTAL DIRECTIONAL DRILLING SYSTEM INCLUDING SONDE POSITION DETECTION USING GLOBAL POSITIONING SYSTEMS

(71) Applicant: VERMEER MANUFACTURING COMPANY, Pella, IA (US)

(72) Inventors: Scott Alan Rempe, Pella, IA (US); Tony Briggs, Pella, IA (US); David Hanson, Colbert, WA (US); Keith Sjostrom, Des Moines, IA (US); Nathan Copeland, Pella, IA (US); Hans Kelpe, Pella, IA (US); Tod Michael, Chariton, IA (US); Chad Van Soelen, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 188 days.

(21) Appl. No.: 15/477,428

(22) Filed: Apr. 3, 2017

(65) Prior Publication Data
US 2017/0335677 A1 Nov. 23, 2017

Related U.S. Application Data

(63) Continuation of application No. 14/127,839, filed as application No. PCT/US2012/043589 on Jun. 21, 2012, now Pat. No. 9,611,732.
(Continued)

(51) Int. Cl.
*E21B 47/024* (2006.01)
*E21B 47/09* (2012.01)
(Continued)

(52) U.S. Cl.
CPC ............ *E21B 47/0905* (2013.01); *E21B 7/04* (2013.01); *E21B 7/046* (2013.01);
(Continued)

(58) Field of Classification Search
CPC ...... E21B 47/02224; E21B 44/00; E21B 7/04; E21B 47/024; E21B 7/10; E21B 47/02216; E21B 47/09; G01V 3/12
See application file for complete search history.

(56) References Cited

U.S. PATENT DOCUMENTS 4,768,152 A 8/1988 Egli et al.
5,155,442 A 10/1992 Mercer
(Continued)

OTHER PUBLICATIONS

Extended European Search Report for corresponding European Patent Application No. 18166002.8 dated Jun. 27, 2018, 6 pages.
(Continued)

*Primary Examiner* — Kipp C Wallace
(74) *Attorney, Agent, or Firm* — Merchant & Gould P.C.

(57) ABSTRACT

A locator device and methods of use are disclosed. The locator device includes a first locating system configured to generate to sense an electromagnetic field emanating from a sonde associated with a drill head, and a second locating system including a global positioning system. The locator device includes a display on the locating system configured to display a map of the area in which the locator device resides based on a location detected by the global positioning system. The locator device also includes control electronics configured to, upon receipt of an input from a user, record location data in a memory associated with the locator device for use by a horizontal directional drilling control system.

14 Claims, 21 Drawing Sheets

Related U.S. Application Data

(60) Provisional application No. 61/499,581, filed on Jun. 21, 2011, provisional application No. 61/530,155, filed on Sep. 1, 2011, provisional application No. 61/625,190, filed on Apr. 17, 2012.

(51) Int. Cl.
*E21B 47/022* (2012.01)
*E21B 7/04* (2006.01)
*E21B 47/12* (2012.01)
*G01V 3/30* (2006.01)
*G01V 3/08* (2006.01)

(52) U.S. Cl.
CPC ...... *E21B 47/02224* (2013.01); *E21B 47/122* (2013.01); *G01V 3/08* (2013.01); *G01V 3/30* (2013.01)

(56) References Cited

U.S. PATENT DOCUMENTS

| | | |
|---|---|---|
| 5,337,002 A | 8/1994 | Mercer |
| 5,764,062 A | 6/1998 | Mercer |
| 5,904,210 A | 5/1999 | Stump et al. |
| 6,250,402 B1 | 6/2001 | Brune et al. |
| 6,308,787 B1 | 10/2001 | Alft |
| 6,315,062 B1 | 11/2001 | Alft et al. |
| 6,749,029 B2 | 6/2004 | Alft et al. |
| 6,768,307 B2 | 7/2004 | Brune et al. |
| 6,886,644 B2 | 5/2005 | Stump et al. |
| 7,304,479 B2 | 12/2007 | Brune et al. |
| 8,188,747 B2 | 5/2012 | Mercer |
| 2002/0020561 A1 | 2/2002 | Alft et al. |
| 2003/0063013 A1 | 4/2003 | Jin et al. |
| 2003/0197509 A1 | 10/2003 | Mizuno |
| 2005/0183887 A1 | 8/2005 | Rodney |
| 2007/0203639 A1 | 8/2007 | Van Den Broeck |
| 2008/0004798 A1 | 1/2008 | Troxler et al. |
| 2009/0024443 A1 | 1/2009 | Graham et al. |
| 2009/0070672 A1 | 3/2009 | Hartwick |
| 2010/0141261 A1 | 6/2010 | Overby et al. |
| 2012/0245850 A1 | 9/2012 | Bang et al. |

OTHER PUBLICATIONS

International Search Report for corresponding International Patent Application No. PCT/US2012/043589 dated Oct. 25, 2012, 4 pgs.

HORIZONTAL DIRECTIONAL DRILLING SYSTEM INCLUDING SONDE POSITION DETECTION USING GLOBAL POSITIONING SYSTEMS

CROSS-REFERENCE TO RELATED APPLICATIONS

This application is a continuation of U.S. patent application Ser. No. 14/127,839, filed Aug. 5, 2014, now U.S. Pat. No. 9,611,732, which is a National Stage Application of PCT/US2012/043589, filed Jun. 21, 2012, which claims priority to U.S. Provisional Patent Application No. 61/499,581, filed Jun. 21, 2011, U.S. Provisional Patent Application No. 61/530,155, filed Sep. 1, 2011, and U.S. Provisional Patent Application No. 61/625,190, filed Apr. 17, 2012, the disclosures of which are hereby incorporated by reference in their entireties. To the extent appropriate, a claim of priority is made to each of the above disclosed applications.

TECHNICAL FIELD

The present disclosure relates generally to detection of underground objects, such as a sonde. In particular, the present disclosure relates to systems and techniques using global positioning systems for detecting a position of a sonde.

BACKGROUND

Utility lines for water, electricity, gas, telephone, and cable television are often run underground for reasons of safety and aesthetics. Sometimes, the underground utilities can be buried in a trench that is subsequently back filled. However, trenching can be time consuming and can cause substantial damage to existing structures or roadways. Consequently, alternative techniques such as horizontal directional drilling (HDD) are becoming increasingly more popular.

A typical horizontal directional drilling machine includes a frame on which is mounted a drive mechanism that can be slidably moved along the longitudinal axis of the frame. The drive mechanism is adapted to rotate a drill string about its longitudinal axis. The drill string comprises a series of drill pipes threaded together. Sliding movement of the drive mechanism along the frame, in concert with the rotation of the drill string, causes the drill string to be longitudinally advanced into or withdrawn from the ground.

In a typical horizontal directional drilling sequence, the horizontal directional drilling machine drills a hole into the ground at an oblique angle with respect to the ground surface. To remove cuttings and dirt during drilling, drilling fluid can be pumped by a pump system through the drill string, over a drill head (e.g., a cutting or boring tool) at the end of the drill string, and back up through the hole. After the drill head reaches a desired depth, the drill head is then directed along a substantially horizontal path to create a horizontal hole. Once the desired length of hole has been drilled, the drill head is then directed upwards to break through the ground surface, completing a pilot bore.

When horizontal directional drilling is performed, it is important to know the location and direction of travel of underground drilling equipment, to ensure that the underground line is routed properly, and to the correct destination. There are various ways to locate underground utilities and underground drill heads, for example, using electromagnetic (EM) locators. EM locators typically include a receiver and a transmitter, which may be a radiating underground conductor. In some systems, a radiating underground conductor can be a sonde, a battery operated cylindrical device having a length of a few centimeters to few decimeters. A typical sonde has a single coil oriented along the cylindrical axis (also known as the dipole axis), with an integrated tone transmitter that causes an induced EM field to emanate symmetrically from the sonde. An above ground EM locating receiver detects and processes the signal, and presents transmitter location information to a user. In this manner, an underground conduit pipe can be traced above ground as a sonde is pulled or pushed through from one end, or a trenchless underground boring tool can be guided from information derived from the position of the sonde. Conventional EM locators, however, do not provide for precise determination of the location and orientation of sondes and exhibit some practical use limitations relating to the geometric relationship between the EM locator receiver and the sonde transmitter.

Attempts to improve location techniques typically revolve around taking additional EM field measurements from known locations. For example, as described in U.S. Patent Application No. 2010/0141261, a location system includes a sonde configured to distribute radio frequency signals along three axes, to communicate with an above-ground radio frequency locator. The location system detects the sonde location by measuring electromagnetic field and phase values at above ground locations traversing across a path of travel of the sonde.

However, such advanced field measurements require a great deal of calibration to accurately detect the presence of the sonde, thereby taking additional time to measure for and locate the sonde. This involves a number of operations at the job site prior to drilling to set up the area to execute a planned drilling operation along a desired route. Furthermore, even once such measurements are taken, the position of the sonde and associated drill head must be extrapolated relative to known points and mapped relative to those points, which adds to computational complexity. Additionally, even once such locations are in fact determined, it can be difficult to assess, both at the drilling rig and remotely (e.g., by a project manager of a construction company, utility or other entity executing or requesting the boring operation).

For these and other reasons, improvements are desirable.

SUMMARY

In accordance with the following disclosure, the above and other issues are addressed by the following:

In a first aspect, a locator device is disclosed. The locator device includes a first locating system configured to generate to sense an electromagnetic field emanating from a sonde associated with a drill head, and a second locating system including a global positioning system. The locator device includes a display on the locating system configured to display a map of the area in which the locator device resides based on a location detected by the global positioning system. The locator device also includes control electronics configured to, upon receipt of an input from a user, record location data in a memory associated with the locator device for use by a horizontal directional drilling control system.

In a second aspect, a method of locating a sonde associated with an underground drill head is disclosed. The method includes calculating an approximate location of a sonde based on a direction and distance from a drilling rig, and placing a locator device at the approximate location using a global positioning system. The method further includes determining a signal strength of an electromagnetic signal generated by the sonde when the locator device is at the approximate location. The method also includes determining a location of the sonde by placing the locator device at a position near the approximate location, the position corresponding to a maximum electromagnetic signal strength.

In a third aspect, a method of operating a horizontal directional drilling machine is disclosed. The method includes placing a locator device at a plurality of positions along a planned bore path, and at least of the plurality of positions, capturing a location of the locator device using a global positioning system, thereby capturing a route defined by a plurality of captured locations. The method further includes downloading the route to a horizontal directional drilling control system.

In a fourth aspect, a GPS-based locator device useable in horizontal directional drilling applications is disclosed that includes a locating system including a global positioning system and a display configured to display a map of the area in which the locator device resides based on a location detected by the global positioning system. The GPS-based locator device includes control electronics configured to, upon receipt of an input from a user, record location data in a memory associated with the locator device for use by a horizontal directional drilling control system, and a communication interface configured to communicate the location data to a horizontal directional drilling control system.

In a further aspect, a horizontal directional drilling system is disclosed that includes a horizontal directional drilling machine positioned at a job site, and a horizontal directional drilling data server positioned remotely from and communicatively connected to the horizontal directional drilling machine. The horizontal directional drilling data server includes a database configured to collect operational data from the horizontal directional drilling machine in at least near real-time, the operational data including GPS data indicating an approximate location of the horizontal directional drilling machine.

In a still further aspect, a horizontal directional drilling system is disclosed that includes a horizontal directional drilling machine located at a job site and including a drill string, a drill head coupled to the drill string, a control system, and a communication interface capable of communicating with a remote computing system. The horizontal directional drilling system also includes a mobile locator device including a sensing device configured to measure attributes of the drill head to generate the drill head attribute data, and a GPS receiver configured to receive GPS data indicating an approximate location of the mobile locator device. The mobile locator device also includes a radio configured to broadcast position data and drill head attribute data to the horizontal directional drilling machine. The horizontal directional drilling system also includes a horizontal directional drilling data server positioned remotely from the job site and configured to receive the GPS data from the horizontal directional drilling machine via the communication interface.

In a further aspect, a horizontal directional drilling data server is disclosed that is communicatively connected to a plurality of horizontal directional drilling machines at geographically dispersed locations. The horizontal directional drilling data server includes a database configured to store a plurality of types of data from each of the horizontal directional drilling machines selected from the group consisting of: bore plan data; boring logs; job data; site data; rig telematics data; maintenance data; and reports.

In a still further aspect, a method of determining a position of a bore path having a starting location, a first location, and a second location is disclosed. The method includes boring from the starting location to the first location, estimating a region in which the first location resides based at least in part on GPS data captured by an above-ground locator, and narrowing the region based on a length of a drill string extending from the starting location to the first location. The method further includes boring from the first location to the second location, estimating a second region in which the second location resides based at least in part on GPS data captured by an above-ground locator, and narrowing the second region based on a second length of a drill string extending from the starting location to the second location. The method also includes narrowing the first region based on the narrowed second region.

DETAILED DESCRIPTION

In general, the present disclosure relates to an overall arrangement in which horizontal directional drilling operations are coordinated and tracked, and in particular methods by which locations, status, and performance of horizontal directional drilling equipment can be tracked and assessed.

In some aspects, the present disclosure relates to a locating device for a horizontal directional drilling (HDD) system, in which a global positioning system (GPS) can be integrated, thereby allowing a user to preplan and map a path of travel of a drill head and associated sonde. According to the various embodiments disclosed herein, a number of advantages are provided by use of GPS, including simplifying location-based calculations, while providing additional flexibility regarding mapping and planning of routes for underground HDD procedures.

Figure 1A:
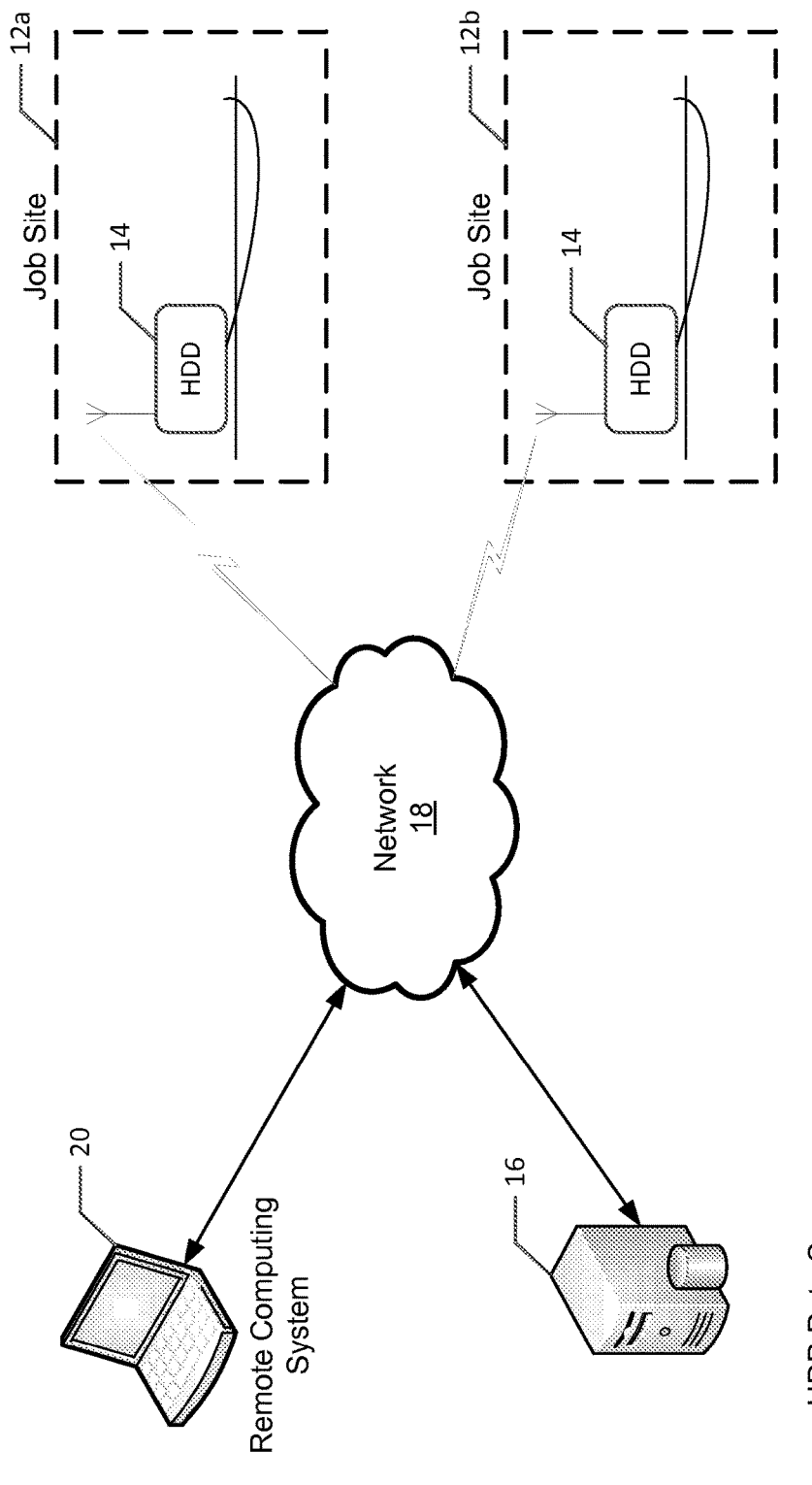
FIG. 1A is a schematic diagram of an overall arrangement in which horizontal directional drilling operations are coordinated and tracked, according to a possible embodiment of the present disclosure.

Referring now to FIG. 1A, an overall arrangement 10 useable for coordinating and tracking horizontal directional drilling operations is disclosed. The arrangement 10 generally allows for planning, supervision, management, and review of horizontal directional drilling operations at one or more job sites without requiring that all individuals be present at that job site. In particular, the arrangement 10 allows for distributed, real-time or near real-time job data communication across a distributed network, for example to allow remote monitoring.

In the embodiment shown, the arrangement 10 includes a plurality of job sites 12, shown as job sites 12*a-b*. Each of the job sites 12 are generally locations at which horizontal directional drilling operations are requested and performed. In embodiments, the various job sites 12 can be at geographically dispersed locations, and generally only require some type of accessible communicative connection (e.g., via an Internet, cellular, satellite, or other data connection) capable of maintaining real-time or near real-time data exchange with remote systems.

In the embodiment shown, each of the job sites has at least one horizontal directional drilling (HDD) machine 14 positioned at that site, and including an antenna or other type of data transmission mechanism. In the embodiment shown, a wireless data communication mechanism is disclosed. However, in various embodiments, wired and/or wireless data communications of various types could be used.

In the embodiment, each of the job sites are communicatively connected to a data repository, illustrated as a HDD data server 16, via a network 18. The HDD data server 14 generally is configured to store various information relevant to one or more drilling operations, including bore plans or other pre-drilling operational parameters, as well as data regarding operational parameters of the HDD machine, details regarding planned, current, and past locations of a drill string (as discussed below), or other location information could be stored at the HDD data server 16 as well (e.g., map data, topographic data). Other information, such as maintenance information regarding the HDD machine 14, can be received from the HDD machines 14 at job sites 12 as well. The network 18 represents any of a variety of communicative connections, as described above, typically including one or more wireless data connections, such as cellular, satellite, or wireless Internet (e.g. 802.x) data communication.

A remote computing system 20 can be used to access data at the HDD data server 16, for example to monitor and/or affect operation of one or more of the HDD machines 14 at job sites 12. For example, a user of the remote computing system 20 can define one or more bore plans for use at a job site, or access and modify such bore plans prior to or during a HDD job. Additionally, due to relatively constant data communication between a HDD machine 14 and the HDD data server 16, a user of the remote computing system 20 can monitor operation of the HDD machine 14 during the boring operation, despite being located remotely from the job site 12, in real-time or near real-time.

In some embodiments, the HDD data server 16 and associated job sites 12 are affiliated with a common owner or controller, such as a single construction company or utility. As such, individuals affiliated with that entity are provided access to data relating to the one or more job sites associated with the entity, both current and historical. As explained in further detail below, this allows remote users (i.e., users not physically located at a particular job site) to track progress of HDD operations, and to assess performance and accuracy of HDD procedures based on planned and actual boring processes.

Figure 1B:
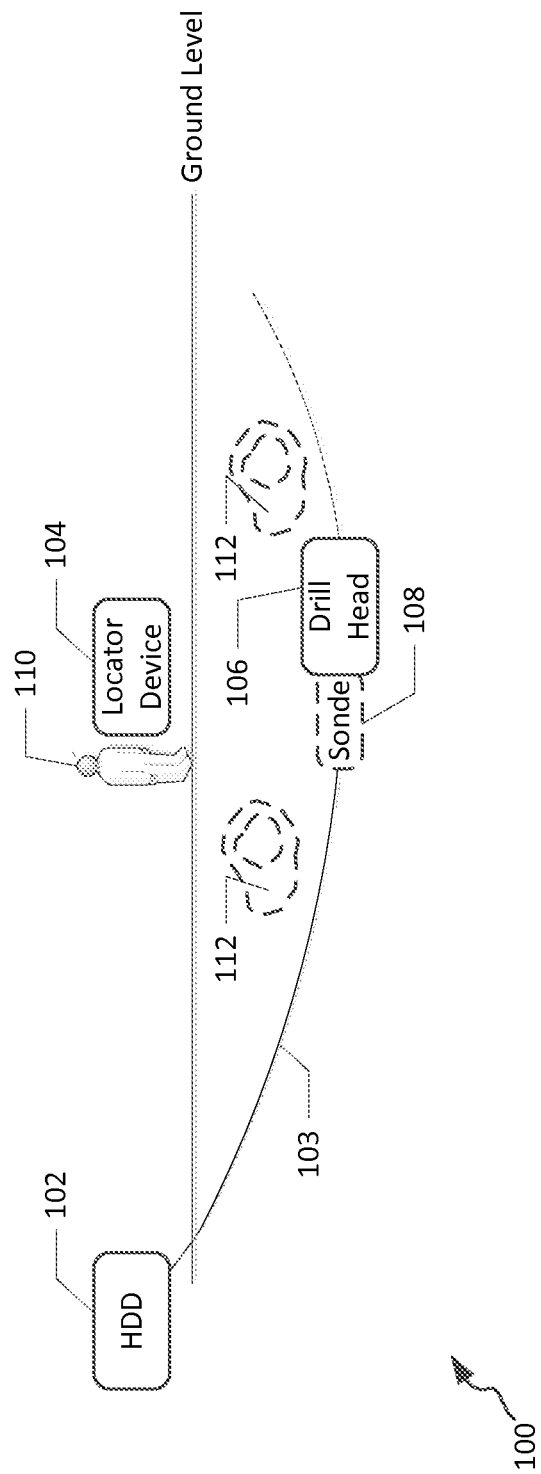
FIG. 1B is a schematic diagram of a horizontal directional drilling system, according to a possible embodiment of the present disclosure.

An example horizontal directional drilling arrangement 100 at a particular job site, also referred to herein as a reference site, is disclosed in FIG. 1B. The arrangement 100 includes a horizontal directional drilling (HDD) machine 102 and a locator device 104. The HDD machine 102, also referred to herein as a drilling rig, is configured to drive and control a drill string 103 having a drill head 106 at a far end. The drill head 106 has an associated sonde 108 configured for one-way or two-way communication with surface electronics, including a control system for the HDD machine 102 (disclosed in FIG. 2, below) and the locator device 104.

As further discussed below, the locator device 104 can be any of a number of different types of location systems, and typically in the embodiments disclosed herein incorporates a locator circuit including a global positioning system (GPS). An operator 110 can move the locator device 104 above ground, allowing the locator device to communicate with the sonde 108, thereby tracking the location of the sonde and associated drill head 106. This information can be communicated with the HDD machine 102 via a communication interface, as discussed below in connection with FIG. 2. Optionally, rather than being used by an operator 110, the locator device 104 can be either an automated machine or a self-propelled device such as a robot.

In general, during operation of the HDD machine 102, a drill string 103 extends from the HDD machine 102 via an underground path. The HDD machine 102 steers the drill string 103 by communicating particular commands to the drill head 106, thereby forming a path of a desired shape and at a desired depth. The locator device 104 can be used to track the position of the drill head 106, to allow the operator 110 to communicate course corrections back to the HDD machine 102, to arrive at a desired destination while avoiding obstacles as necessary (e.g., rocks 112 as shown, but also including buildings, other underground installations or wires, pipes, etc.).

Figure 2A:
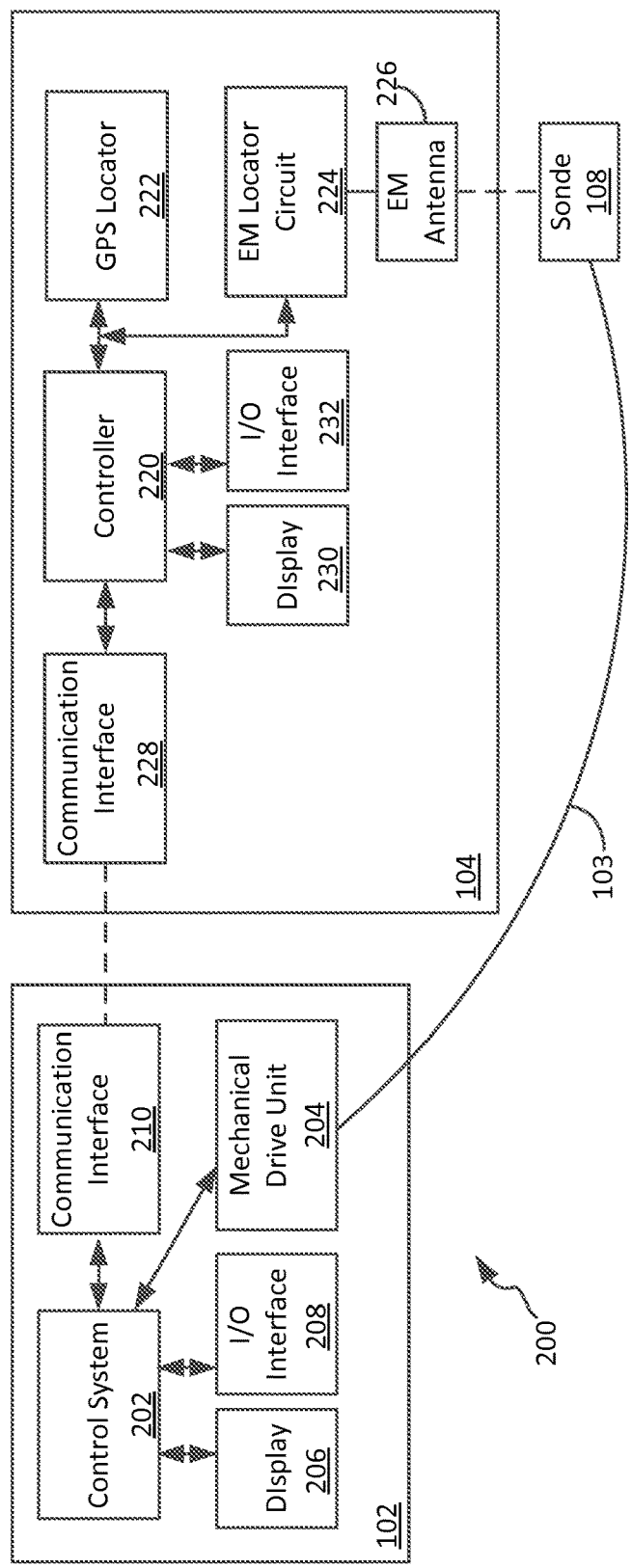
FIG. 2A is a schematic diagram of a horizontal directional drilling system including a locator device integrating GPS features, according to a possible embodiment of the present disclosure.

Referring now to FIG. 2A, an example schematic diagram of a HDD system 200 including the HDD machine 102 and the locator device 104 is shown. In the embodiment shown, the HDD machine 102 includes a control system 202 configured to direct operation of the drill string 103 via a mechanical drive unit 204. The HDD machine 102 also includes a display 206 and I/O interface 208, which allow an operator to view a current operational status, planned route (i.e., bore plan), and various other parameters of the HDD machine 102. The HDD machine 102 also includes a communication interface 210 configured for two-way communication with the locator device 104. The communication interface 210 can use, in various embodiments, any of a number of types of wired or wireless communication connections; in certain embodiments, the communication interface 210 uses a persistent wireless connection to the locator device, such that data associated with a location of the sonde 108 can be communicated back to the HDD machine 102.

The locator device 104 includes a control circuit 220 and a plurality of locator circuits, shown as GPS locator circuit 222 and EM locator circuit 224. The control circuit 220 performs a number of operations relating to (1) developing a bore plan for a drill rig, and (2) tracking a drill head and associated sonde during operation of the drill rig. The control circuit receives information from the GPS locator circuit 222 to determine a current location of the locator device 104, and uses the EP locator circuit 224 to receive communications from the sonde 108 (e.g., to associate the current location of the locator device with the location of the sonde). An antenna 226 associated with the EM locator circuit is configured to pick up electromagnetic signals from the sonde for processing at the EM locator circuit. The EM locator circuit 224 also optionally receives information regarding other operational parameters of the sonde 108 and associated drill head 106, for example rotational or linear speed, temperature, or other current operating parameters, such as a pitch of bit, clock/roll position of bit, depth of bit, fluid pressure at bit, product tension measured at bit, and vibration at the bit. Other parameters can be tracked as well.

The antenna 226 can be, for example a simple antennae device for measuring a magnetic field information of the signal being transmitted by the sonde 108, as would be necessary to generate signal strength information, or alternately the antenna 226 could be more elaborate to also measure additional characteristics of the magnetic field—as would be required to also measure the shape/orientation of the "flux lines" associated with the sonde 108. For example, details pertaining to a three-axis antenna may be found in U.S. Pat. No. 6,768,307, filed Mar. 21, 2003, and titled "Flux Plane Locating in an Underground Drilling System" and in U.S. Pat. No. 7,304,479, filed Jan. 4, 2007, and titled "Flux Plane Locating in an Underground Drilling System," the disclosures of which are hereby incorporated herein by reference.

The locator device 104 also includes a complementary communication interface 228 that communicates with the communication interface 210 of the HDD machine 102. The locator device 104 therefore can transmit bore plan information, current operational status information, or other types of information to the HDD machine, such that each machine can track and control operational features of the drill head 106.

Figure 5:
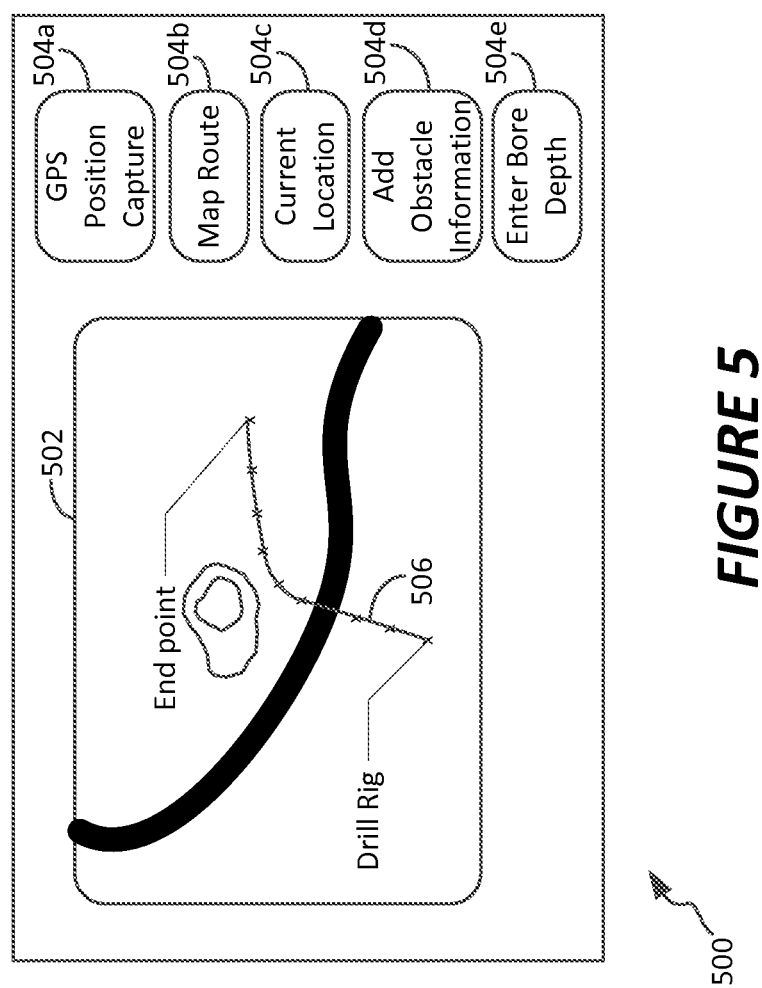
FIG. 5 is a schematic of an example display illustrating a mapped route for a horizontal directional drilling process, according to a possible embodiment of the present disclosure.
Figure 6:
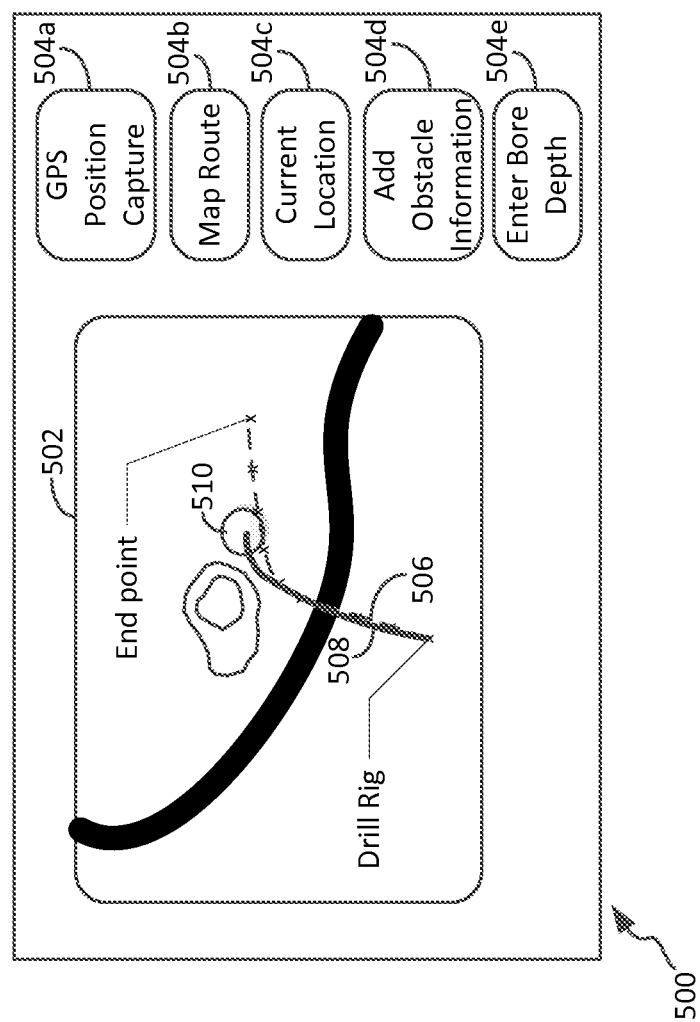
FIG. 6 is a schematic of an example display illustrating a current location of a sonde superimposed on a mapped route during a horizontal directional drilling process, according to a possible embodiment of the present disclosure.

The locator device 104, in certain embodiments, enables display of a number of parameters relating to operation of the drill head 106 on a display 230, alongside a map of the current location of the locator device 104 and HDD machine 102. The display 230 can be used, for example, to establish a bore plan, or to track the current position of a sonde 108. Associated I/O interfaces 232 allow for a keypad or other buttons to be implemented on the locator device 104 as well, for example to assist in mapping various features, such as the bore path, bore depth, obstacles, or other information. Example displays are illustrated in FIGS. 5-6, below.

Figure 2B:
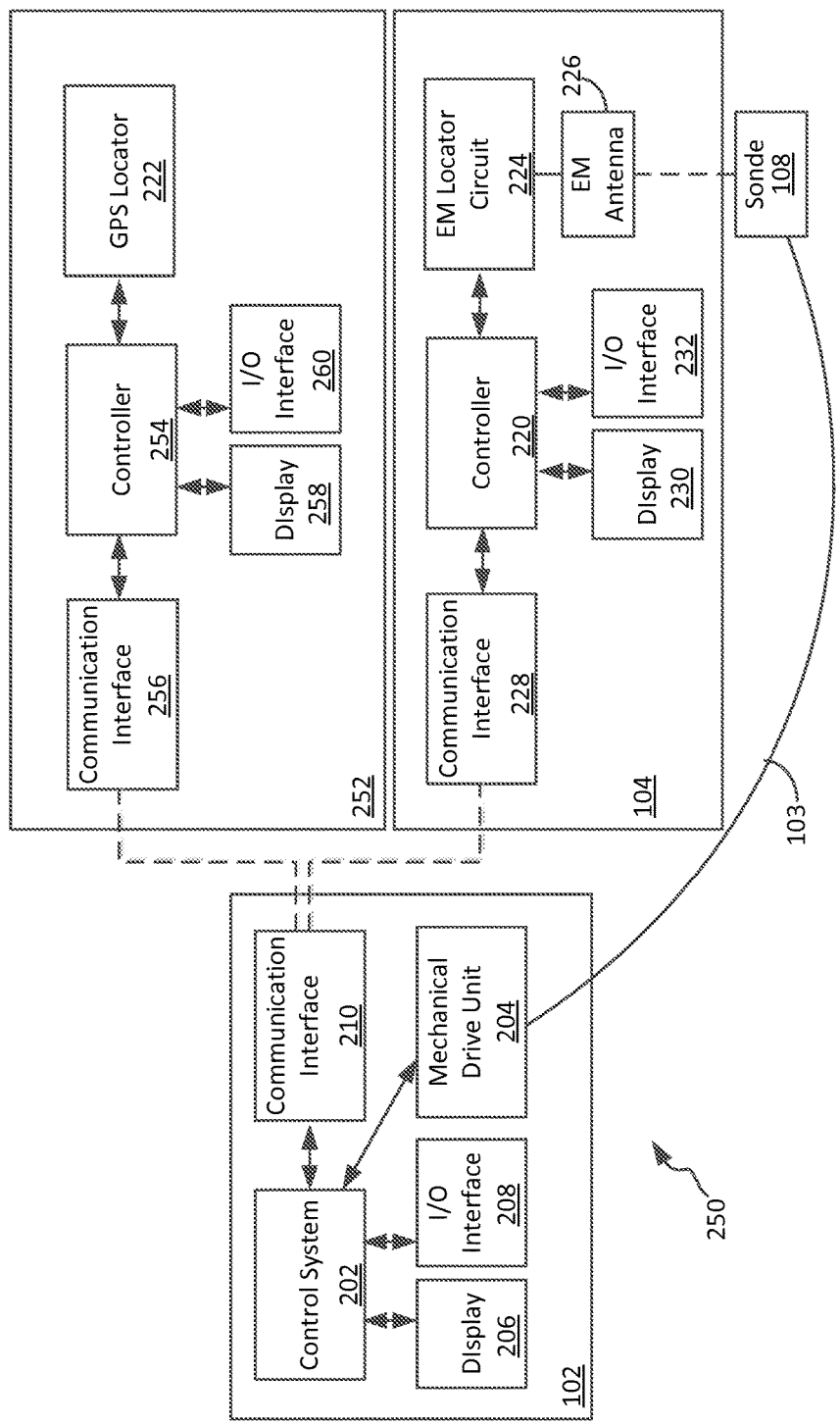
FIG. 2B is a schematic diagram of a horizontal directional drilling system including a locator device and a GPS locator, according to an alternative embodiment of the present disclosure.

Referring to FIG. 2B, an alternative schematic diagram of a HDD system 250 is shown. In this embodiment, the locator device 104 does not have a GPS locator circuit 222 located within that unit. Rather, in this embodiment, a separate GPS locator device 252 can be used as a "bolt-on" or additive component to the overall system 250, but can be a stand alone element. In other words, although in certain embodiments the GPS locator device 252 can have a housing mountable to an existing locator device 104, no modification to an existing locator device may be necessary. As compared to the system 250 above, the separate GPS locator device 252 contains the GPS locator circuit 222, as well as a GPS control circuit 254, communication interface 256, display 258, and I/O interface 260. The GPS locator device 252 generally is configured to be positioned in proximity with the locator device 104, and can be configured to record GPS readings and communicate those readings back to control system 202 of the HDD machine 102 for combination with information from the locator device 102 regarding a location of the sonde 108.

In certain alternative embodiments, a data communication connection can be established between the controllers 220, 254 of the devices 104, 252, such that sonde location and GPS location data can be combined without requiring a communication connection to the HDD machine 102.

Figure 3:
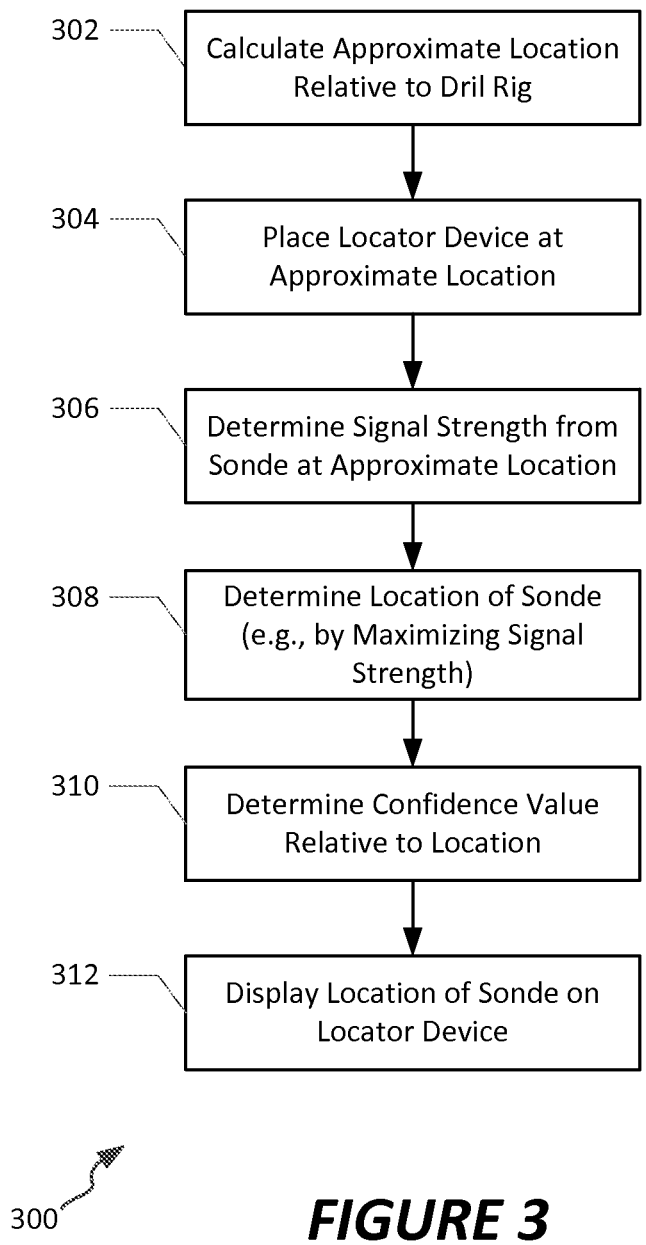
FIG. 3 is a flowchart of a method of locating a sonde associated with underground drilling equipment, according to a possible embodiment of the present disclosure.

FIG. 3 is a flowchart of a method 300 of locating a sonde associated with underground drilling equipment, according to a possible embodiment of the present disclosure. The method 300 can be, in various embodiments, performed using a locator device such as disclosed above, for example during operation of a HDD machine as discussed above. The method 300 starts with calculating an approximate location of a drill head relative to the drill rig, for example by determining the direction and speed of travel from the drill rig of the drill head, or by tracking a number of drill rods included in a particular drill string (step 302).

The method then includes positioning a locator device (e.g., locator device 104) at the approximate location (step 304) based on the calculation in step 302. A signal strength of an electromagnetic signal generated by the sonde is then detected at the approximate location (step 306). Additional signal strength readings in the area of the approximate location can also be taken, such that a location of the sonde can be determined (step 308). This can be performed in a number of ways. For example, repeated measurements in the area of the approximate location can be taken until a maximum signal strength is detected, at which it can be assumed that the locator device is closest to the sonde (i.e. directly above the sonde and drill head). Alternatively, after a number of readings, the locator device can perform a triangulation operation to determine the location of the sonde.

Based on these one or more measurements, a confidence value can be determined that relates to the accuracy with which the sonde's position is known (step 310). This can be based upon, for example, the magnitude of the sonde readings received at the locator device, the number of points used to triangulate to the sonde, or other factors.

Once the sonde is located, any of a number of operations can be performed. For example, a user can press a button on the locator device 104 to cause its control system to record pitch, depth and GPS location data for display at the rig, and to compare to a bore plan being used. The locator device can be configured to generate a map of the area in which the locator device is positioned on its display (or alternatively on the display of the HDD machine), showing the location of the sonde and drill head (step 312). In some such embodiments, the position of the sonde and drill head can be represented by a circle positioned over an area of a map, the circle representing the confidence value in the locator device's current computed position for the sonde. An example of such a display is illustrated in FIG. 6, described below.

In addition, the display can include information generated by the locating device that includes both GPS location information related to the location of the locating device (e.g., latitude and longitude readings, or a position relative to a drill rig), and information related to magnetic field strength measurements measured by the locating device, that were emitted by a drill head transmitter. Other information could be displayed as well.

Figure 4:
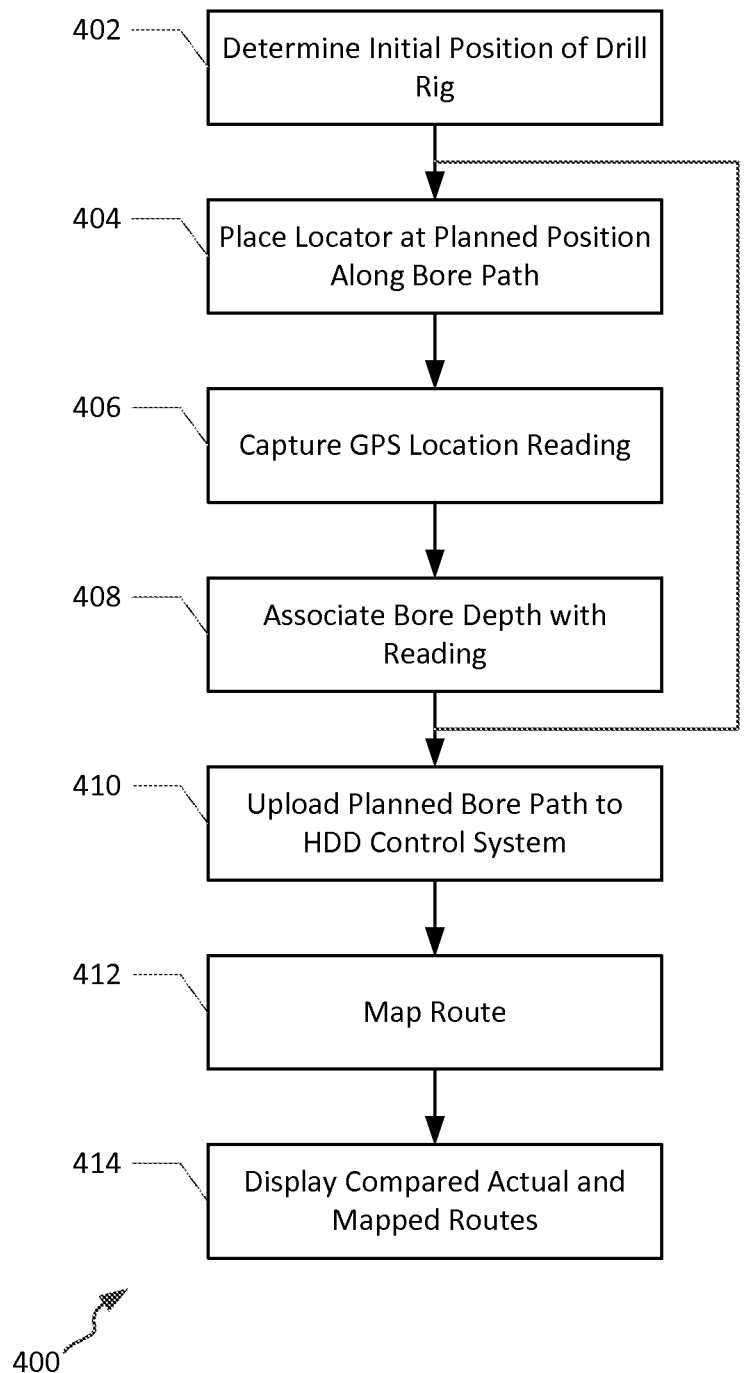
FIG. 4 is a flowchart of a method of operating a horizontal directional drilling system, according to a possible embodiment of the present disclosure.

Referring now to FIG. 4, a method 400 of operating a horizontal directional drilling system is disclosed, according to a possible embodiment of the present disclosure. The method can be performed by a locator device, an operator, or a combination of the device and other components within an overall HDD system. In particular, the method 400 can be performed as part of a bore path planning process, e.g., as integrated with bore planning software of a drilling rig. The method 400 includes determining an initial location of a drilling rig in an HDD system, for example using a GPS locator circuit in a locator device (step 402). The method 400 can also include positioning the locator device at a position along a planned bore path (step 404), and capturing a location of the locator device using the GPS locator circuit (step 406).

Optionally, the method also includes associating information with each captured point, such as a desired bore depth for the drill string at that particular point (step 408). Steps 404-408 can be repeated at a number of points along a planned bore path for a drill string, thereby capturing a route of the drill string. The route captured by the locator device can be uploaded to a HDD control system on the drill rig, which can translate the mapped route to steering instructions for a drill string to achieve the desired routing result (step 410). A schematic example of a mapped route is illustrated in FIG. 5, below.

Additional features for operating the HDD system can be included into the locator device and drill rig. For example, the mapped route can be displayed on one or both of the locator device and the drill rig, either before, during, or after operation of the drill rig. Either during or after operation of the drill rig, the locator device or drill rig display can generate an as-built map of the bore path (step 412) based on captured GPS readings, e.g., when a user presses a button signifying that the sonde has been located. Additionally, the display can include a comparison of the mapped route to an actual route travelled by the sonde and drill head, to show deviations (if any) from the mapped route (step 414). A schematic example of a comparison between an actual route and mapped route is illustrated in FIG. 6, below. Additionally, when mapping the route or tracking the sonde, a user of the locator device could also manually enter one or more obstacles to be avoided by the drill string, for example a road (e.g., as illustrated in FIGS. 5-6), or other features, such as rocks, buildings, other underground wires, tunnels, or other installations. These obstacles can be added to a bore plan alongside the captured locations and bore depth information, to be uploaded to the drill rig.

FIG. 5 is a schematic of an example display 500 illustrating a mapped route for a horizontal directional drilling process, according to a possible embodiment of the present disclosure. The display 500 can represent a display of a locator device or of the drill rig, and can include one or both of a monitor 502 and input buttons 504a-e used on that equipment.

In the embodiment shown, the monitor 502 includes a map indicating a planned route for a drill string. The display includes a route 506 extrapolated from a number of captured location points (illustrated by the "x" notations on the map). The captured location points can be captured, for example, by placing the locator device at a desired location and pressing an input button (e.g., button 504a) to signal that the location is to be captured. An overall route can be mapped using a further button (e.g., button 504b). Obstacle information and bore depth can be added to the map as well (e.g., using buttons 504d-e).

Referring now to FIG. 6, the example display 500 is illustrated during an actual drilling process, for example to track a sonde and associated drill head once the mapped route is uploaded to a drill rig. In this illustration, the monitor 502 includes both the mapped route 506 and an actual route 508 travelled by the sonde. The monitor also displays a current location 510 of the sonde. As discussed above, the current location 510 can be represented by a circle covering an area of the map, for example representing a confidence level that the sonde is in a particular location. In such embodiments, a smaller circle would represent a higher confidence in the sonde's current position. Once the drilling process is complete, the actual route 508 can represent an as-built map of the bore path. As explained above, the actual route 508, and mapped route 506, can be transmitted back to a HDD data server, such as server 16, for storage and/or review. Additionally, as the actual route 508 is tracked, the mapped route 506 can be altered, e.g., due to changes in conditions or based on changes in the actual route 508, from the server 16 or other remote system, such as remote computing system 20 of FIG. 1A.

Now referencing both FIGS. 5-6, although a particular layout of buttons is illustrated, this illustration is for discussion purposes only; it is understood that various other arrangements of buttons or display features could be provided.

Generally using the methods and systems disclosed herein, the locator device or drill rig can combine data/information generated by the drill rig and locator device to show an estimated location of a drill head, with information generated by the locating device that comprises both (1) GPS location information related to the location of the locating device and (2) information related to magnetic field strength measurements measured by the locating device that were emitted by a sonde associated with the drill head. This allows for simple mapping and tracking of a bore path and boring process, without requiring multiple, repeated electromagnetic field measurements, and allowing a drill head location to be directly determined, rather than only tracked relative to a drill rig. Other advantages are provided by the methods and systems disclosed herein as well.

As discussed in FIGS. 7-16, some additional techniques may be applied by the HDD machine and/or the locators to increase the accuracy of the calculated position based on the received GPS signals. The techniques described in FIGS. 7-15 may be used in conjunction with any of the systems and methods described above to determine the position of the HDD machine, the locators, and/or the drill head. Accordingly, the techniques described in FIGS. 7-15 may be used to increase the accuracy in tracking a position of the drill head and/or mapping a bore plan.

Figure 7:
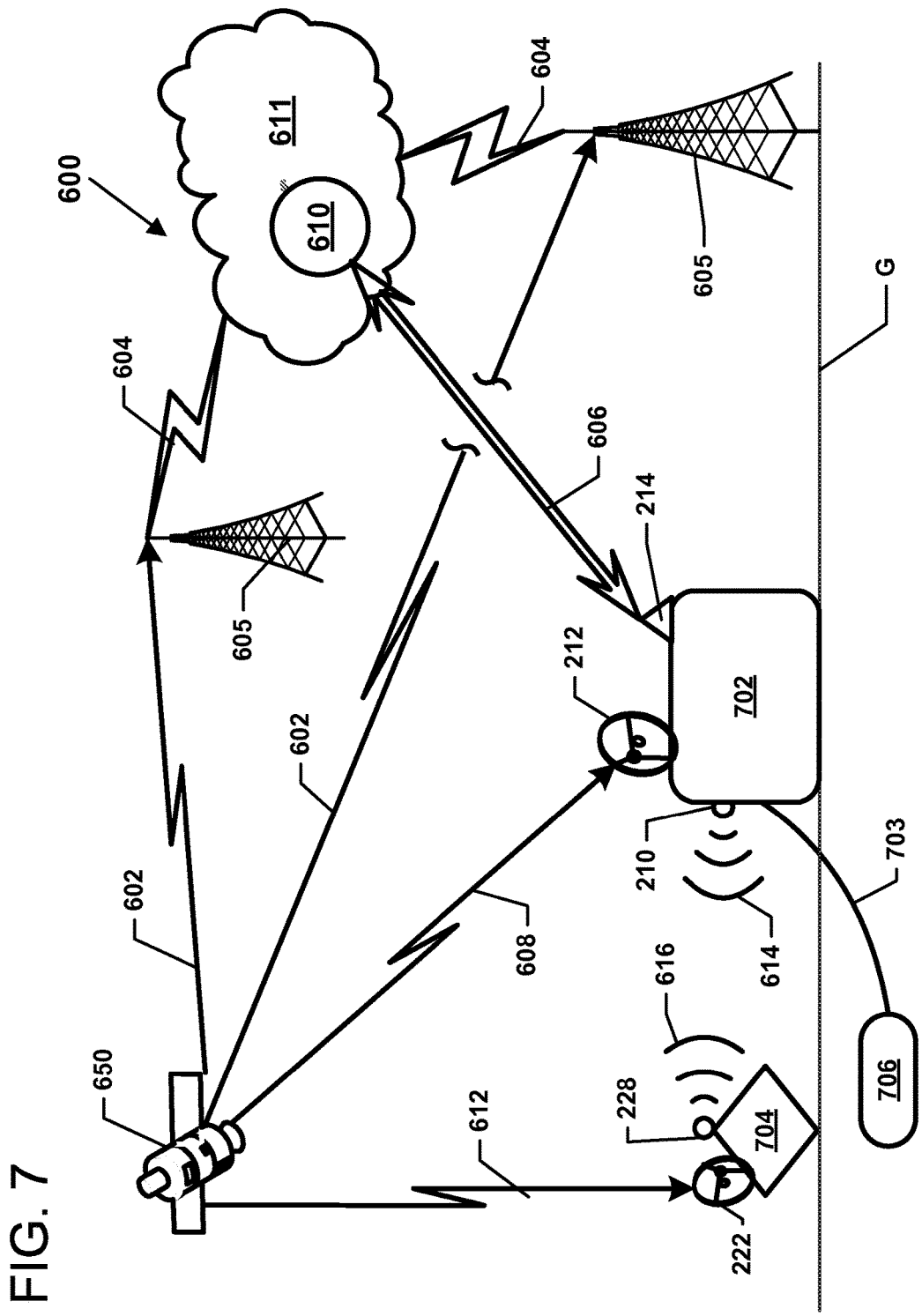
FIG. 7 illustrates an example drilling system in an example global positioning system environment.

FIG. 7 illustrates an example drilling system in an example global positioning system environment 600. The global positioning system environment 600 includes four or more navigation satellites 650 in steady orbit around the globe. An HDD machine 702 may be positioned at a location covered by the network 611. One or more locators 704, which are equipped to locate the sonde 708 of the drill string 703, may be deployed in an area around the HDD machine 702.

The HDD machine 702 is configured to receive signals 608 from one or more satellites 650 by which the HDD machine 702 may calculate its approximate position. Each locator 704 also is configured to receive signals 612 from one or more satellites 650 by which the locator 704 may calculate its approximate position. In certain implementations, the HDD machine 702 and the locator 704 each receive signals 608, 612 from four satellites 650. In certain implementations, the HDD machine 102 and the locator 704 each receive signals 608, 612 from the same four satellites 650.

In some implementations, the global positioning system environment 600 is configured to provide differential global positioning. For example, in certain implementations, the global positioning system environment 600 also includes one or more reference sites at surveyed locations that include satellite signal receivers 605. Position correction information corresponding to the area around each reference site is generated based on a comparison between the known position and the position obtained from the signal measured by receiver 605.

The receivers 605 are connected to a network 611. In some implementations, the reference sites are equipped with sufficient processing power to calculate their location (i.e., or information from which their location can be calculated) based on the received satellite signals and to compare the calculated information with their known (e.g., surveyed) position. In such implementations, the receivers 605 provide the position correction to the network 611. In other implementations, the reference sites provide the measured signals and their known location information to the network 611 for subsequent processing.

In certain implementations, a computer system 610 (e.g., personal computer, server computer, group of networked computers, cloud computers, etc.) receives this information from multiple reference sites and determines the position correction information for an area covered by the network 611. For example, the position correction information may be determined for the area around each reference site and the areas between two or more reference sites. In some cases, the position correction information can be determined based on information gathered from multiple reference sites. For example, position correction information pertaining to an area between three reference sites may be determined based on information obtained at all three reference sites.

The network 611 is configured to disperse the position correction information to one or more satellite receivers (e.g., at the HDD machine 702 and/or at the locators 104) within the network 611. In some implementations, the HDD machine 702 is configured to receive position correction data from the network 611 and to distribute the position correction data to each of the locators 704. For example, the computer system 610 may send the position correction information to the HDD machine 702 for dispersal to the locators 704. The HDD machine 702 and the locators 704 may each apply the position correction information to their calculations to determine their respective corrected positions.

In some implementations, the HDD machine 702 receives the position correction data over a cellular line 606 and distributes the correction data over a radio signal transmission 614. In certain implementations, the HDD machine 702 and the locator 704 communicate over 2-way radio signals. For example, certain types of HDD machines 702 are configured to receive the corrected positions of the locators over a radio signal transmission 616. In other implementations, however, the HDD machine 702 may be configured to receive the position correction data over a WIFI signal, a wired signal, or via some other type of communication equipment.

In some implementations, the HDD machine 702 and locators 704 may exchange other types of information. For example, in certain implementations, the HDD machine 702 may communicate with each locator 704 over a two-way radio. In some implementations, the HDD machine 702 sends information calculated by the HDD machine 702 to each of the locators 704. For example, the HDD machine 702 may calculate its corrected position and send its corrected position to each of the locators 704. In certain implementations, the HDD machine 702 may obtain measurements pertaining to the carrier signal received from the satellites 650 and may transmit the obtained carrier measurements to the locators 704 as will be disclosed in more detail herein.

Figure 8:
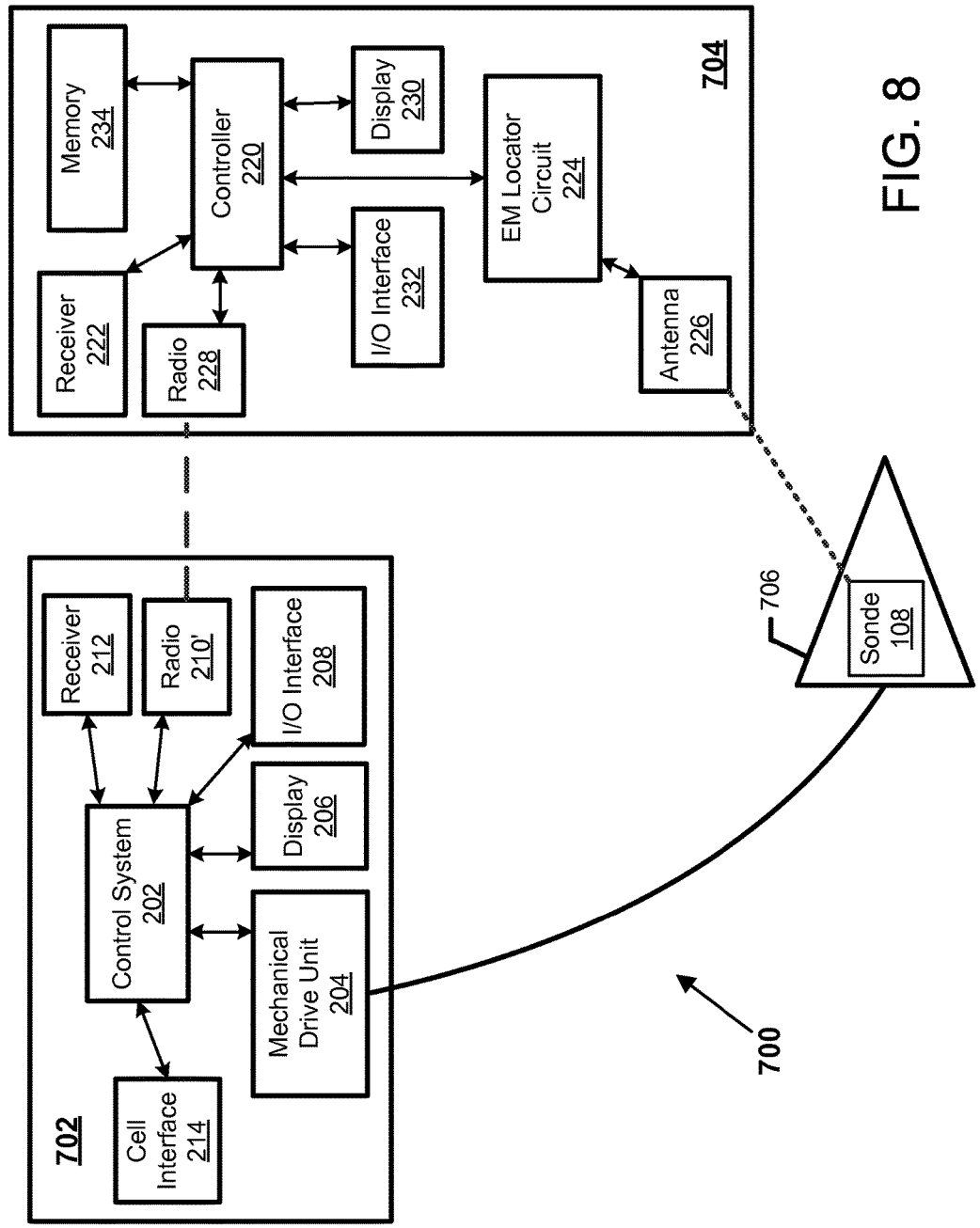
FIG. 8 is a block diagram of an HDD system including an HDD machine and an example locator.

FIG. 8 is a block diagram of an HDD system 700 including the HDD machine 702 and the locator device 704 is shown. In the embodiment shown, the HDD machine 702 includes a control system 202 configured to direct operation of the drill string 703 via a mechanical drive unit 204. The HDD machine 702 also includes a display 706 and I/O interface 708, which allow an operator to view a current operational status, planned route, and various other parameters of the HDD machine 702. The HDD machine 702 also includes a receiver (e.g., a GPS receiver) 212 that is configured to receive the transmission signals from the satellites 650.

In some implementations, the HDD machine 702 also includes a cellular interface 214 with which the HDD machine 702 receives the position correction information from the computer system 610. In other implementations, the HDD machine 702 includes another type of communications interface to receive the position correction information from the network 611. The HDD machine 702 also includes a two-way radio 210' configured for two-way communication with the locator device 704. The two-way radio 210' allows position correction data to be dispensed to the locators 104 and to allow data associated with a location of the sonde 708 can be communicated from the locator 704 back to the HDD machine 702.

The locator device 704 includes a control circuit 220 and a plurality of locator circuits, shown as GPS locator circuit 222 and EM locator circuit 224. The control circuit receives information from the GPS locator circuit 222 to determine a current location of the locator device 704. The control circuit 220 may apply position correction data obtained from the HDD machine 702 to the determined current location to compute a corrected position of the locator 704. The locator 704 also uses the EM locator circuit 224 to receive communications from the sonde 108 (e.g., to associate the corrected position of the locator device 704 with the location of the sonde 708).

An antenna 226 associated with the EM locator circuit 224 is configured to pick up electromagnetic signals from the sonde 708 for processing at the EM locator circuit 224. The EM locator circuit 224 also optionally receives information regarding other operational parameters of the sonde 708 and associated drill head 706, for example rotational or linear speed, temperature, or other current operating parameters, such as a pitch of bit, clock/roll position of bit, depth of bit, fluid pressure at bit, product tension measured at bit, and vibration at the bit. Other parameters can be tracked as well. The antenna 226 can be, for example, a simple antennae device for measuring a magnetic field information of the signal being transmitted by the sonde 708, as would be useful for generating signal strength information, or alternately the antenna 226 could be more elaborate to also measure additional characteristics of the magnetic field—as would be useful for measuring the shape/orientation of the "flux lines" associated with the sonde 708.

The locator device 704 also includes a complementary two-way radio 228' that communicates with the radio 210' of the HDD machine 702. The locator device 704, therefore, can transmit bore plan information, current operational status information, or other types of information to the HDD machine 702, such that each machine can track and control operational features of the drill head 706.

The control circuit 220 performs a number of operations relating to (1) developing a bore plan for a drill rig, and (2) tracking a drill head and associated sonde during operation of the drill rig. The locator device 704, in certain implementations, enables display of a number of parameters relating to operation of the drill head 706 on a display 230, alongside a map of the current location of the locator device 704 and HDD machine 702. The display 230 can be used, for example, to establish a bore plan, or to track the current position of a sonde 708. Associated I/O interfaces 232 allow for a keypad or other buttons to be implemented on the locator device 704 as well, for example to assist in mapping various features, such as the bore path, bore depth, obstacles, or other information.

Figure 9:
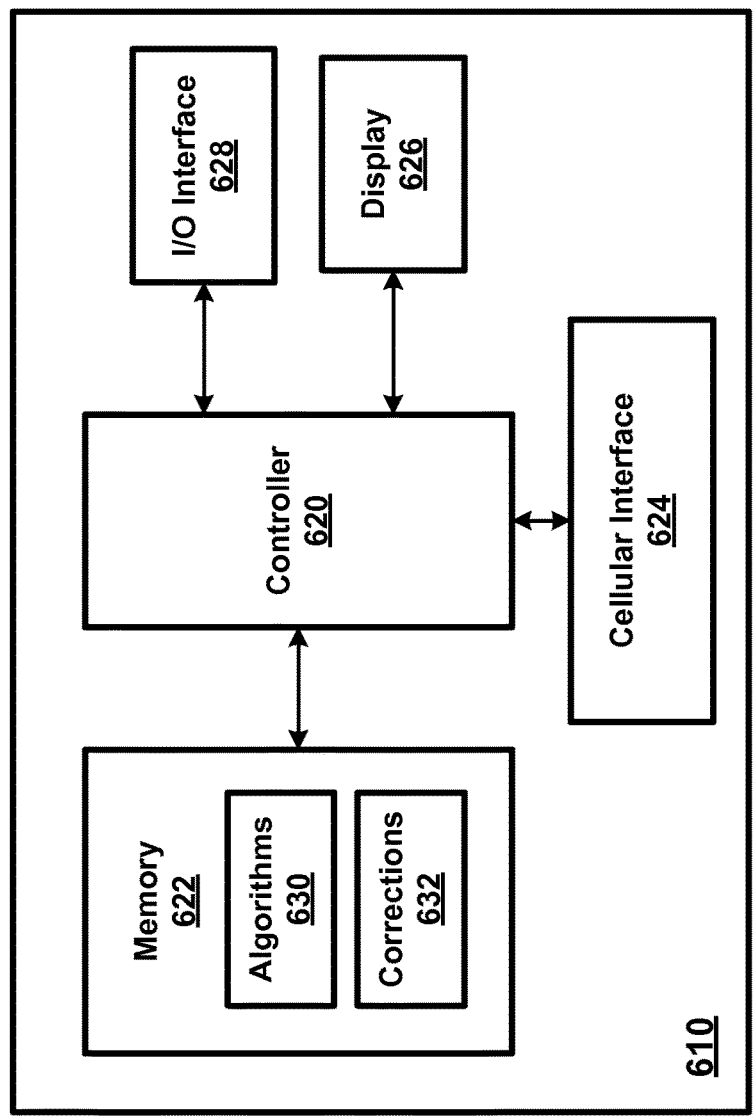
FIG. 9 is a block diagram of a computer system forming part of an example receiver network.

FIG. 9 is a block diagram of a computer system 610 forming part of the network 611. The computer system 610 may be implemented on one or more computer devices. The computer system 610 includes a controller 620 that is connected to a cellular interface 624. In some implementations, the computer system 610 sends the position correction information to the HDD machine 702 using the cellular interface 624. In certain implementations, the computer system 610 also receives information from the reference site receivers 605 via the cellular interface 624. In other implementations, the computer system 610 is otherwise connected to the reference site receivers 605.

The computer system 610 also includes memory 622 at which position correction data 632 for the network and algorithms 630 for computing the position correction data 632 are stored. In some implementations, the controller 610 receives the position correction data from the reference site receivers 605 and stores the position correction data in the memory. In other implementations, the controller 610 receives the measured data and the known position data from the reference site receivers 605 and computes the position correction data. In certain implementations, the controller 610 computes position correction data for an area in the network that is spaced from one of the reference site receivers 605.

Figure 10:
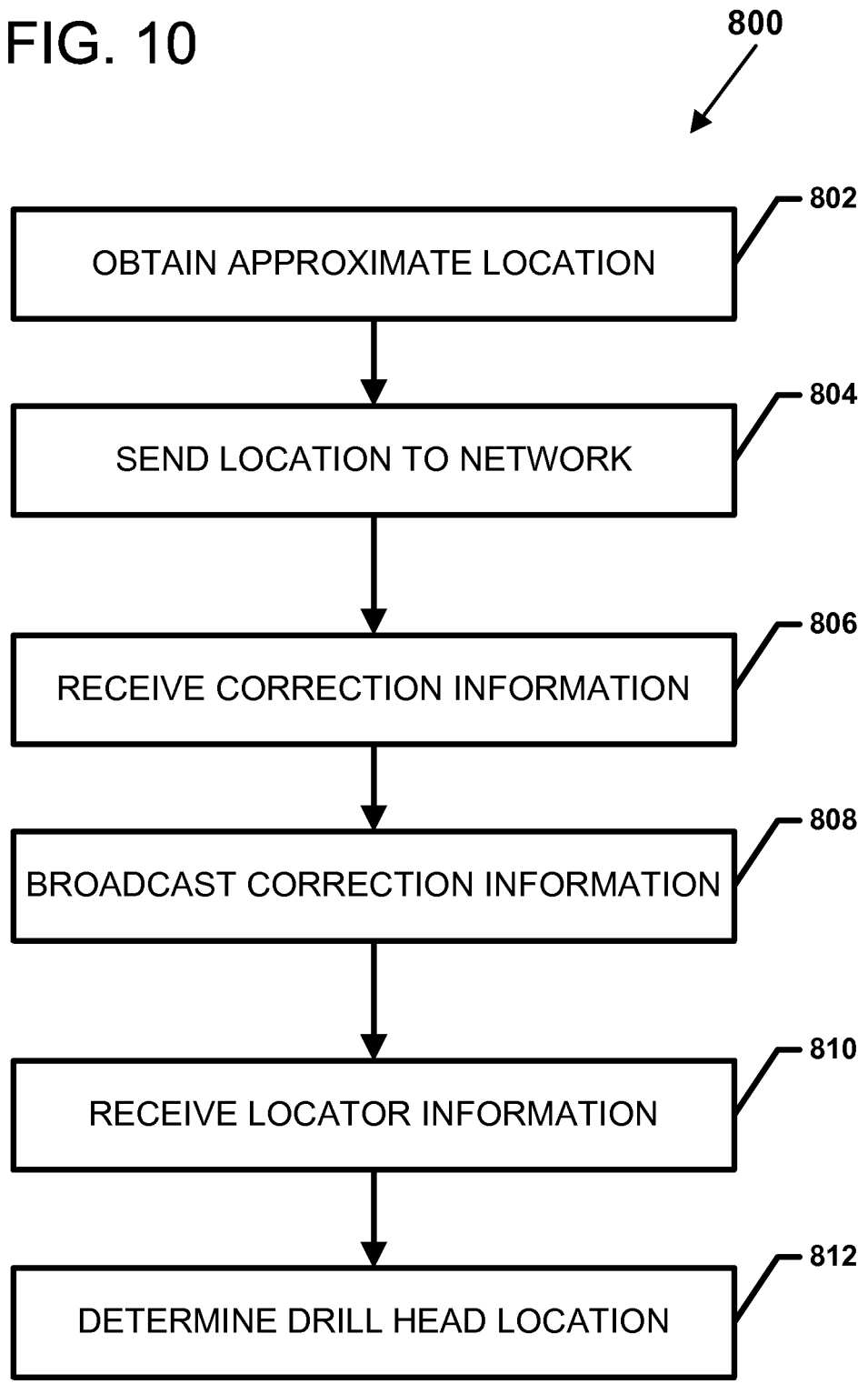
FIG. 10 is a flowchart of a method of locating underground drilling equipment using a differential GPS analysis, according to a possible embodiment of the present disclosure.

FIG. 10 is a flowchart of a method 800 of locating underground drilling equipment using a differential GPS analysis, according to a possible embodiment of the present disclosure. The method 800 can be, in various embodiments, performed using an HDD machine, such as the HDD machine 702 discussed above. The method 800 starts with the HDD machine 702 determining its approximate location (step 802). In some implementations, the HDD machine 702 receives a signal from one or more satellites 650 while disposed at a position and calculates its position based on the received signal. For example, in certain implementations, the GPS receiver 212 of the HDD machine 702 may receive signals from four satellites 650. In other implementations, the GPS receiver 212 may receive signals greater or fewer satellites 650.

The HDD machine 702 sends its approximate location to the network 611 (step 804). In some implementations, the HDD machine 702 establishes a cellular connection to the computer system 610 and sends its approximate location to the computer system 610 over the cellular connection. In other implementations, however, the HDD machine otherwise communicates its approximate location to the computer system 610. The HDD machine 702 receives position correction information (step 806) from the network 611 (e.g., from the computer system 610). In some implementations, the HDD machine 702 receives the position correction information over a cellular signal. In certain implementations, the HDD machine 702 also receives from the network 611 its own corrected position calculated based on the correction information.

The HDD machine 702 distributes the position correction information (step 808) to one or more locators 704. In some implementations, the HDD machine 702 broadcasts the position correction information to the locators 704 over a two-way radio, such as radio 210'. In one embodiment, the HDD machine 702 also sends its own corrected position to the locators 704. In another embodiment, the HDD machine 702 does not send its own corrected position to the locators 704. The HDD machine 702 receives (step 810) locator information (e.g., a corrected position of the locator 704 and attributes of the drill head 706) from the locator 704. In some implementations, the HDD machine 702 receives the locator information from the locator 704 over the two-way radio 210'. The HDD machine 702 determines the location of the drill head 706 (step 812) based on the information received from the locator(s) 704.

Figure 11:
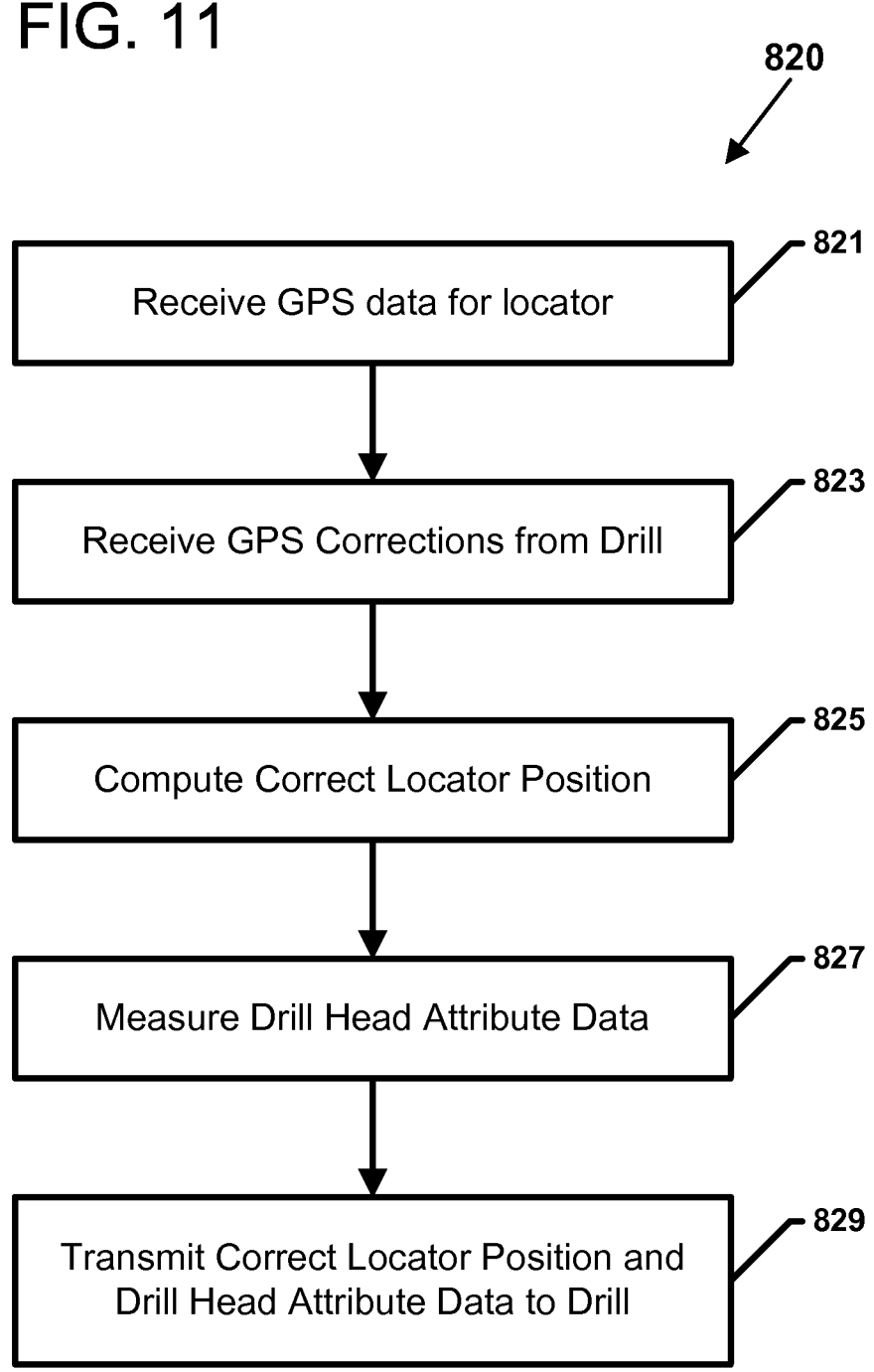
FIG. 11 is a flowchart of a method of locating underground drilling equipment using a differential GPS analysis, according to a possible embodiment of the present disclosure.

FIG. 11 is a flowchart of a method 820 of locating underground drilling equipment using a differential GPS analysis, according to a possible embodiment of the present disclosure. The method 820 can be, in various embodiments, performed using a locator device, such as the locator 704 discussed above. The method 820 starts with the locator 704 receiving (step 821) a signal from one or more satellites 650 while disposed at a position. For example, in certain implementations, the GPS receiver 222 of the locator 704 may receive signals from four satellites 650. In other implementations, the GPS receiver 222 may receive signals greater or fewer satellites 650.

The locator 704 also receives position correction information (step 823) from the HDD machine 702 associated with the location. For example, the locator 704 may receive the position correction information over a two-way radio 228'. In other implementations, the locator 704 may otherwise be in communication (e.g., a wired connection, a WiFi connection, or a cellular connection) with the HDD machine 702. The locator 704 computes (step 825) a corrected position for the locator 704 using the satellite signals and the position correction information obtained above.

The locator 704 measures (step 827) attribute information pertaining to the sonde 708 and/or the drill head 706 while disposed at the same position at which the locator 704 received the satellite signals. For example, the locator 704 may measure a signal intensity received at the antenna 226. In certain implementations, the signal intensity is measured at three of more points, which allows for triangulation of the position of the sonde 708. The locator 704 sends (step 829) the measured attribute information to the HDD machine 702 for processing. Optionally, the locator device 704 may compute a position of the drill head 706 based on its corrected position and the measured attribute information. Optionally, the locator device 704 may display the position of the drill head 706 at the display 230.

Figure 12:
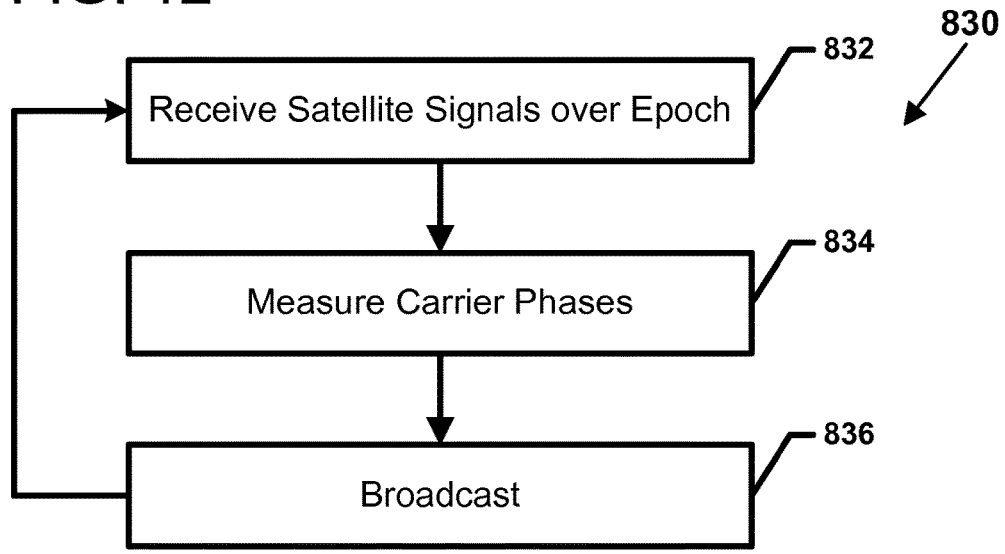
FIGS. 12-14 are flowcharts providing methods that can be used in locating underground drilling equipment using carrier phase tracking.
Figure 13:
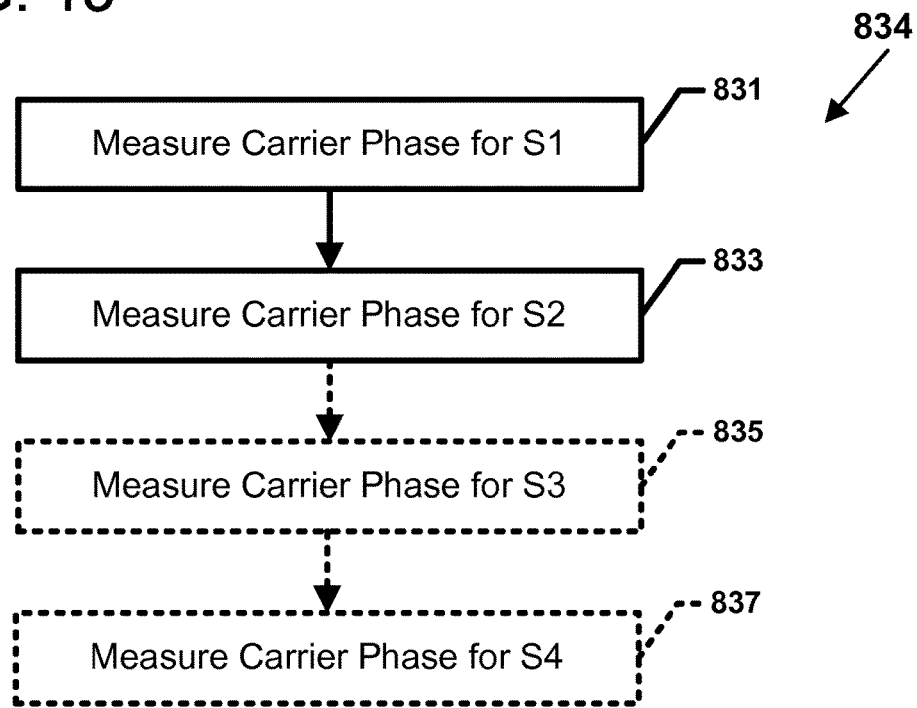
Figure 14:
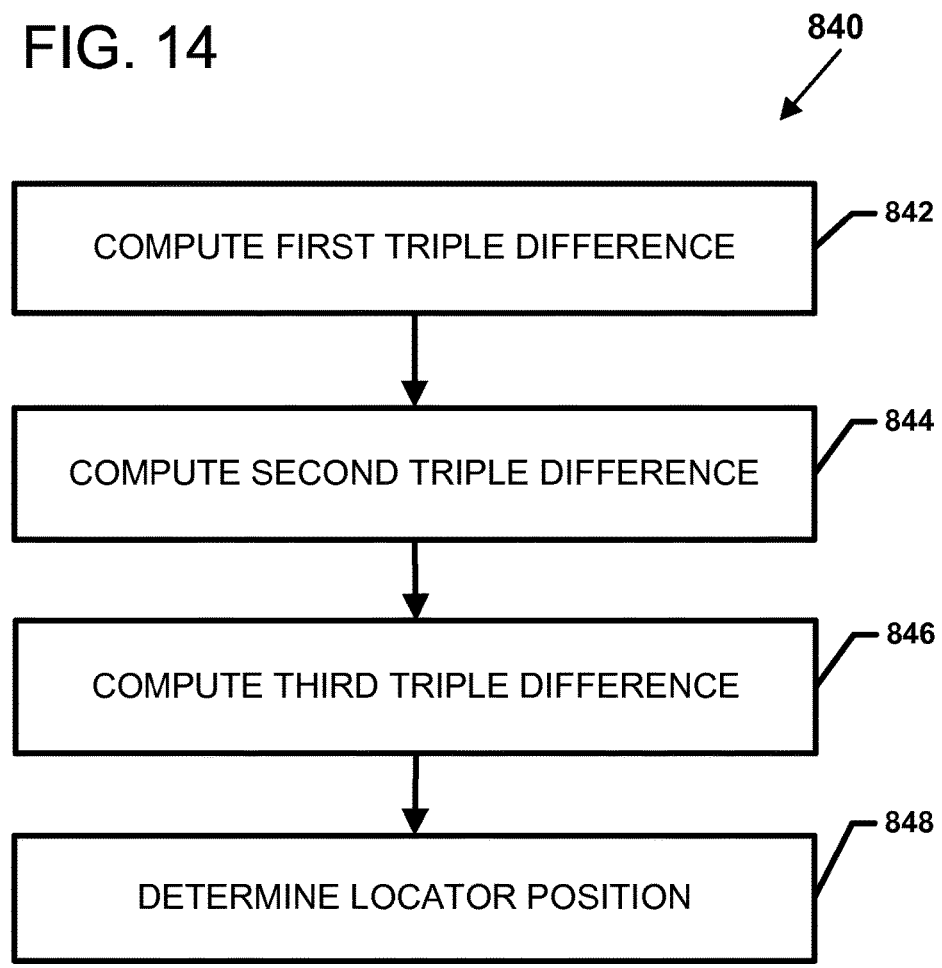

FIGS. 12-14 are flowcharts providing methods that can be used in locating underground drilling equipment using carrier phase tracking. The methods of FIGS. 12-14 allow the locators 704 to compute their respective corrected locations with increased accuracy. Accordingly, the methods of FIGS. 12-14 may be used in conjunction with, or as alternatives to, the methods of FIGS. 9 and 10. The method 830 of FIG. 12 starts with receiving (step 832) signals from one or more satellites 650 at the HDD machine 702. For example, in some implementations, the HDD machine 702 receives satellite signals from four different satellites 650. The receiver 212 of the HDD machine 702 measures (step 834) a phase of the carrier signal over an epoch. The HDD machine 702 broadcasts (836) the measured phase to the locators 704.

FIG. 13 is flowchart illustrating one example implementation of step 834 of the method of FIG. 12. As part of step 834, the HDD machine 702 measures (step 831) the phase of the carrier signal received from a first satellite 650. The HDD machine 702 also measures (step 833) the phase of the carrier signal received from a second satellite 650. Optionally, the HDD machine 702 also measures (step 835) the phase of the carrier signal received from a third satellite 650 and measures (step 837) the phase of the carrier signal received from a fourth satellite 650. Steps 831-837 are implemented concurrently during the same epoch.

The method 840 of FIG. 14 is implemented by at least one of the locators 704 to obtain a corrected position for the locator 704 relative to the HDD machine 702 with increased accuracy. The method is implemented in conjunction with the HDD machine 702 implementing the method of FIG. 12. The method starts with at least one of the locators 704 applying a first triple difference function (step 842) to the carrier phases measured by the drill and the carrier phases measured by the locator 704 over a first time pair as will be described in FIG. 15.

The locator 704 applies a second triple difference function (step 844) to the carrier phases measured by the drill and the carrier phases measured by the locator 704 over a second time pair. The locator 704 also applies a third triple difference function (step 846) to the carrier phases measured by the drill and the carrier phases measured by the locator 704 over a third time pair. The locator 706 determines the corrected position of the locator 704 (step 848) using the three triple difference calculations. For example, the locator 704 may determine the corrected position using the triple difference results, numerical root finding, a least squares procedure, and an approximate position determined based on the satellite signal 650. In certain implementations, correction information obtained from the network 611 may be applied to the approximate position to determine a first corrected position that may be used in the determining step 848.

In other implementations, the locator 704 may send the results of the three triple differences to the HDD machine 702 to calculate the corrected position of the locator 704. In still other implementations, the locator 704 may send the results of the three triple differences to the HDD machine 702, which forwards the results to the computer system 610 for computation of the corrected position of the locator 704. In yet still other implementations, the locator 704 sends it measured phase signals to the HDD machine 702, which either calculates the three triple differences or forwards the locator's measured phases and the HDD machines' measured phases to the computer system 610 for processing.

Figure 15:
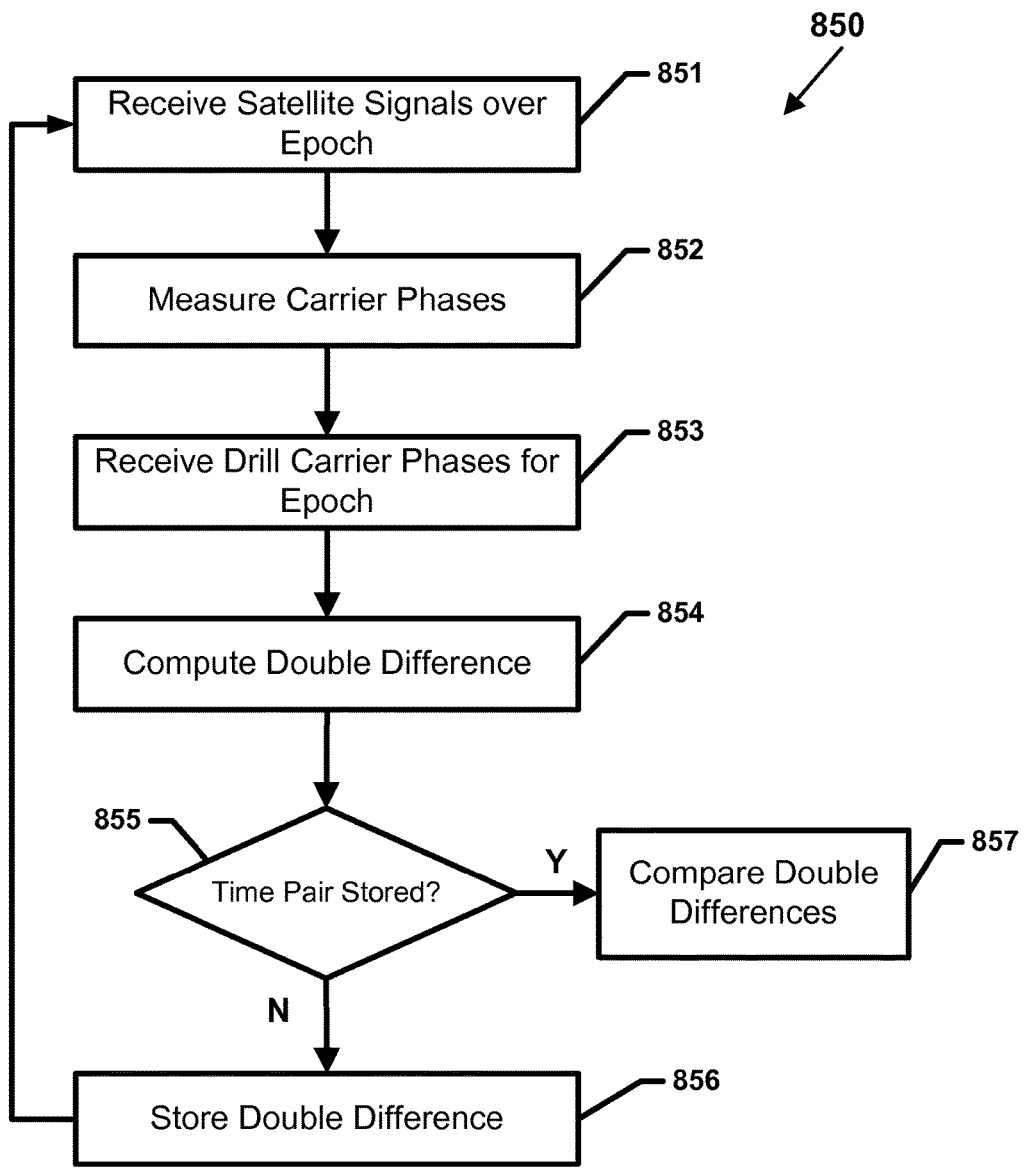
FIG. 15 is a flowchart illustrating a triple difference method that is suitable for use in implementing each of steps of the method of FIG. 14.

FIG. 15 is a flowchart illustrating a triple difference method 850 that is suitable for use in implementing each of steps 842, 844, and 846 of method 840. The triple difference method 850 is implemented by one or more locators 704 in communication with the HDD machine 702. The triple difference method starts by receiving satellite signals (step 851) at the locator 704 over an epoch. The locator 704 receives the signals from the same satellites as the HDD machine 702. For example, in some implementations, the receiver 222 of the locator 704 receives signals from four different satellites 650. In other implementations, the locator 704 receives signals from a greater or lesser number of satellites 650.

The locator 704 measures (step 852) the total phase of the signal received from each satellite 650 during the epoch. In some implementations, the locator 704 measures the total phase of the carrier signal from each satellite. The locator 704 also receives (step 853) the total phase of each satellite signal measured by the HDD machine 702 over the same epoch. The locator 704 computes a double difference (step 854) of the phases.

For example, in certain implementations, the locator 704 analyzes the measured phases and finds a first difference between the carrier phase of a first satellite 650 as measured by the locator 704 and the carrier phase of the first satellite 650 as measured by the HDD machine 702 during the epoch. The locator 704 also finds a second difference between the carrier phase of a second satellite as measured by the locator 704 and the carrier phase of the second satellite as measured by the HDD machine 702 during the same epoch.

The locator 704 determines (step 855) whether another double difference of the satellite signals has already been computer for a different time period. For example, the locator 704 may access the memory 234 of the locator 704 to determine whether such a double difference result has been stored. If no other double difference results has been computed, then the locator 704 stores (step 856) the computed double difference result in memory 234. The triple difference method 850 then cycles back to the receiving step 842 and begins again.

If another double difference has already been computed for the satellite signals obtained over a second epoch, then the locator 704 compares computes a triple difference (step 857) of a time pair by comparing the double difference pertaining to signals obtained over the first epoch with the double difference pertaining to signals obtained over the second epoch.

As noted in the method 840 of FIG. 14, a triple difference is found for at least three different time pairs. In other words, the triple difference is found between the phases measured by the HDD machine 702 and the phases measured by the locator 704 from the same satellite signals received over the same six time periods. Finding the triple difference of these measured phases ameliorates the effects of clock bias errors and integer ambiguity when measuring the satellite signals.

Figure 16:
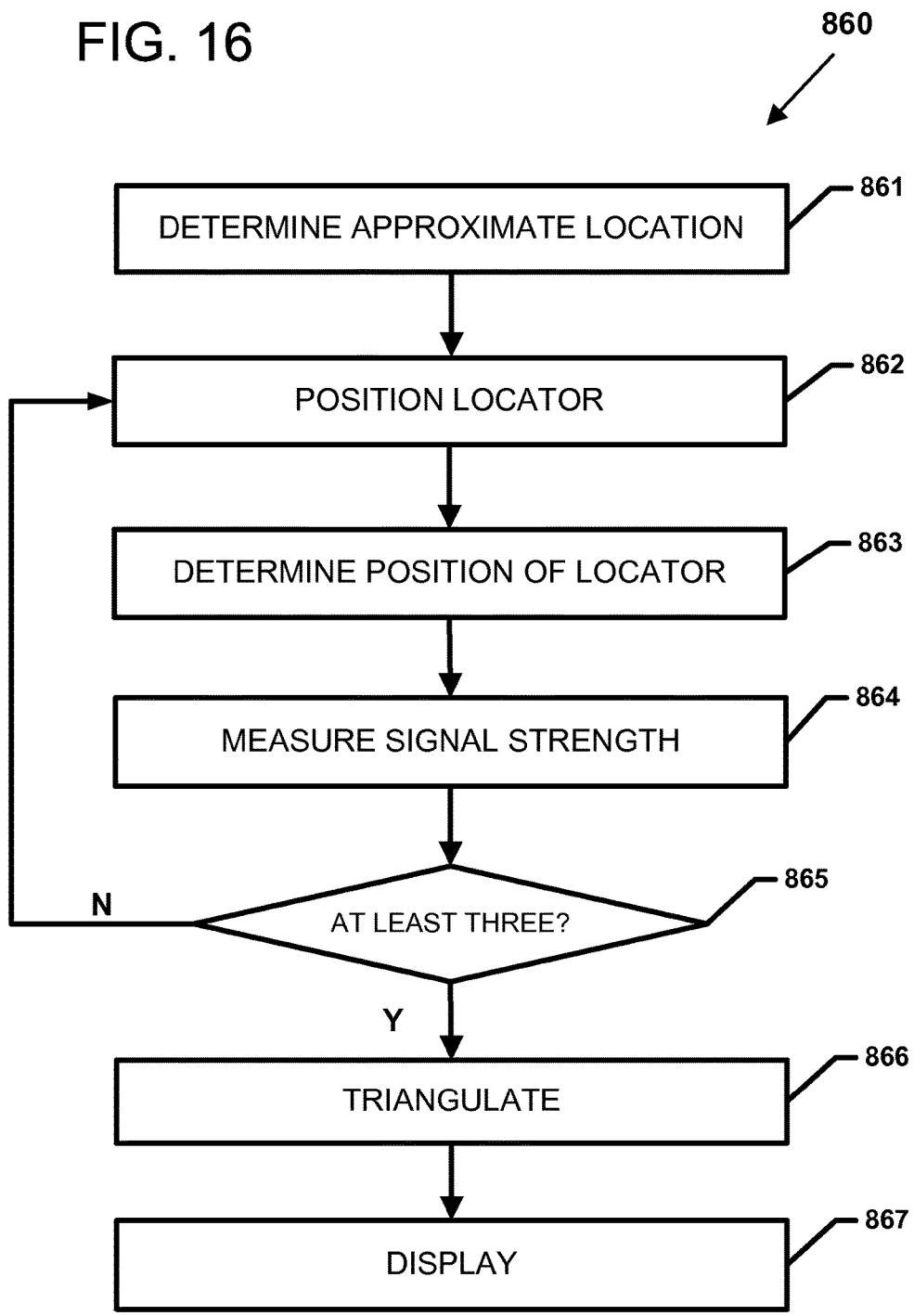
FIG. 16 is a flowchart illustrating a method by which a GPS system can be used to guide (i.e., direct) an operator to the approximate location of the drill head.

FIG. 16 is a flowchart illustrating a method 860 by which a GPS system can be used to guide (i.e., direct) an operator to the approximate location of the drill head 706. The method 860 starts with determining an approximate position of a drill head 706 (step 861). In some implementations, the approximate position of the drill head 706 is determined by determining a position of the HDD machine 702 and determining attributes of a drill string 703 extending from the HDD machine 702. For example, the position of the HDD machine 702 may be determined using a GPS receiver 212 on the HDD machine 702. The attributes of the drill string 703 include the direction and speed of travel of the drill head 706 and/or the number of drill rods used in the drill string 703.

One or more locators 704 are positioned (step 862) at the approximate position of the drill head 706. A geographic position of each locator 704 is determined (step 863). For example, the locator 704 may use the GPS receiver 222 to determine its geographic position. In some implementations, the GPS data obtained by the locators 704 may be enhanced, e.g., using differential GPS, carrier phase tracking, and/or relative kinematic positioning. Each locator 704 also measures (step 864) a signal strength/intensity from the sonde 708 at the drill head 706. For example, the locator 704 uses the EM antenna 226 and locator circuit 224 to measure the signal from the sonde 708. Accordingly, each signal strength measurement is associated with a geographic position.

EM signal strength can be directly related to the proximity of the reading location (i.e., the geographic position of the locator 704) and the sonde location (i.e., the geographic position of the drill head 706). In particular, for each geographic position of the locator 704, the sonde 708 is located along a circumference of a sphere around the geographic position. The radius of the sphere corresponds to the strength/intensity of the signal received from the sonde 708.

Steps 862-864 of the method 860 are repeated until readings have been obtained for at least three geographic positions (step 865). In certain implementations, steps 862-864 are repeated for more than three geographic positions. For example, steps 862-864 may be repeated until at least three geographic positions are associated with measurements above a predetermined threshold. The at least three geographic positions are then triangulated (step 866) to determine the sonde location (and, hence, the drill head 706). In some implementations, the triangulation analysis also includes a calculated circumference of a sphere centered on the geographic position of the HDD machine 702 and having a radius equal to a length of the drill string 703.

The operator is guided (step 867) to the geographic position of the drill head 706. For example, the locator 704 may display a map of the area with a marking showing the geographic position of the sonde 708. In certain implementations, the map also may include a marker indicating the geographic position of the HDD machine 702 and/or another landmark. In other implementations, the map may be displayed at the HDD machine 702.

Figure 17:
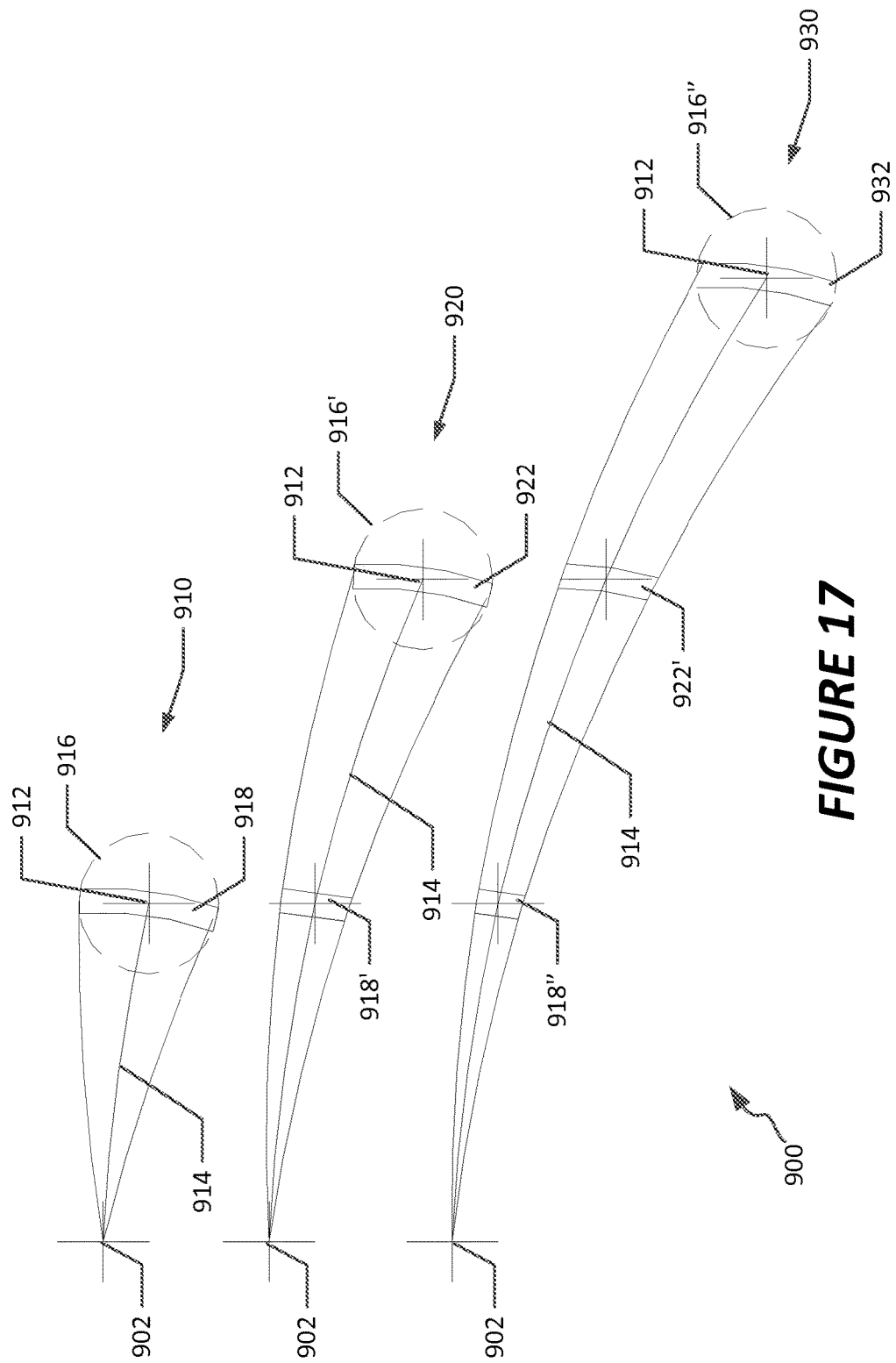
FIG. 17 is a schematic illustration of GPS-based locating technique useable in connection with the methods and systems disclosed herein.
Figure 18:
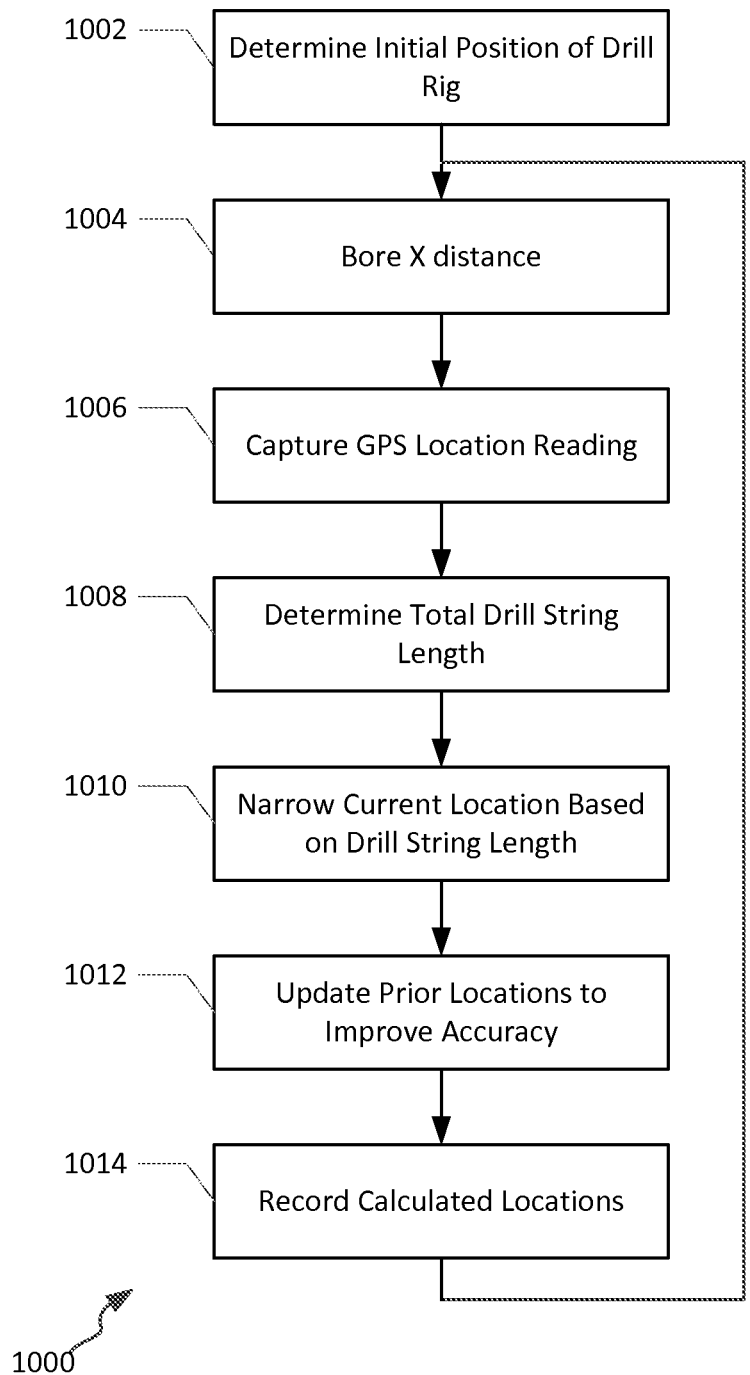
FIG. 18 is a flowchart illustrating a method by which location of a drill head can be refined, using a GPS-based locator system as discussed herein.

Referring now to FIGS. 17-18, a locating technique employing GPS-based technologies is shown, intending to account for the uncertainty/variation issues discussed above in connection with FIGS. 5-6, and in which In particular, FIG. 17 illustrates an example location technique is displayed, useable in connection with the methods and systems disclosed herein, in which a GPS-based locating system is employed. In the embodiment shown, a bore path sequence 900 is illustrated, accounting for uncertainty or variance introduced by GPS-based location. In various embodiments, GPS-based systems may have an uncertainty as to exact location, with a variance of between actual and sensed location of approximately 3 feet. This is represented in the bore path sequence by a first bore path location 910 having a starting point 902, estimated current endpoint 912 of a drill string 914, with a circle 916 representing possible variance in actual location as compared to detected location. As such, bore path location 910 generally corresponds to a current location of a drill head (e.g., a sonde or related boring tool) as detected by a locator, such as might be displayed on a display such as is shown in FIGS. 5-6. It is noted that using the various techniques discussed above in connection with FIGS. 7-16 relating to triangulation, in some cases variance may be lower than 3 feet; however, in other cases where it is difficult to obtain an accurate GPS signal, accuracy may be substantially lower. In either event, accuracy can be improved due to use of a known drill string length, which allows narrowing the possible locations of the drill head to those illustrated in region 918, which are a part of the circle 916.

As drilling proceeds and the drill head moves underground, additional locations can be detected, and the length of the drill string continually monitored. As seen in the second bore path location 920 of the sequence 900, it is noted that a subsequent drill head location can be determined for the drill string 914, by locating a second estimated current endpoint 912', and with a second circle 916' representing the variance in location at this second GPS-captured location. Based on the second circle 916' and a known second length of the drill string 914, a second narrowed region 922 can be established. It is noted that, based on this second narrowed region 922, the first narrowed region 918 can be narrowed to region 918', due to a limit on the possible paths between the various possible locations known at the time of the first bore path location capture 910 and the current bore path location 920, as well as the known length of the drill string 914 at the second bore path location 920.

A third bore path location 930 illustrates a further refinement of the bore path due to a third location capture operation using a GPS unit on a locator, at a third estimated endpoint 912". In this case, the third bore path location results in a third circle 916" representing uncertainty at this location as narrowed to a region 932 based on a known length of the drill string. Based on this information, a further narrowed region 918" can be determined at the first location 910 and a narrowed region 922' at the second location. As such, as a boring operation proceeds along a planned boring path, a known drill string length and estimated current location of a drill head can be used to further refine earlier locations along the boring path. As such, even using periodic estimated locations of a drill head based on GPS variances, an accurate drill string record can be built during the boring process. This "as built" boring path, as determined during the boring process, can be displayed on a display of a drill rig as in FIGS. 5-6, and can be periodically updated based on subsequent location determinations. In some embodiments, these periodic path locations can be captured at the end of each drill string segment, or other regular distance. It is noted that in some circumstances, accuracy as to the location of a drill string may be determined only after the drill head has already passed a particular location by a predetermined distance (e.g., 2-3 drill segments).

In some additional embodiments, it is noted that in addition to current and past locations of a drill head, depth information could be captured as well, and determined relative to a current elevation of the locator as determined by a GPS device.

Referring now to FIG. 18, a generalized process 1000 performed using the locator device is described for refining location data relative to a drill string during a boring operation. The process can be used, for example, to accomplish the location refinement discussed in connection with FIG. 17, and can be performed, in various embodiments, in a GPS-enabled locator device, or on a drill rig associated with such a locator, as described above. In the embodiment shown, the process 1000 includes determining an initial position of a drill rig (i.e., a starting location of a boring process) (step 1002). The process further includes performing an underground horizontal directional drilling operation, i.e., a boring operation, for a known distance (step 1004). The process next includes capturing a GPS location reading at an above-ground position above the drill head, for example using a locator device with integrated GPS (step 1006). This results in a captured current location, with a generally circular variance (e.g., circles 916, 916', 916''' of FIG. 17). A total drill string length is determined (step 1008), and the current location of the drill head is narrowed based on that known drill string length, to arrive at a narrowed variation of current locations of a drill head (step 1010). Any prior locations that have been captured are then updated to narrow those possible locations based on the current variance of locations of the drill head (e.g., resulting in narrowed locations 918', 918'', or 922' of FIG. 17). Each of the calculated locations are then recorded, and the boring process continues at step 1004 to continue boring another distance (e.g., another drill string segment).

Referring to FIGS. 17-18, it is noted that when drilling is completed, an end position of the drill string may be known, since the drill head would emerge at a far end of a bore. As such, additional certainty can be derived from that location, and interim locations captured during the boring process can be further updated, leading to an accurate "as built" bore path using inherently inaccurate locating technologies. As discussed below, such an "as built" bore path can then be stored for review either by the rig or in a computing system remote from the job site.

Figure 19:
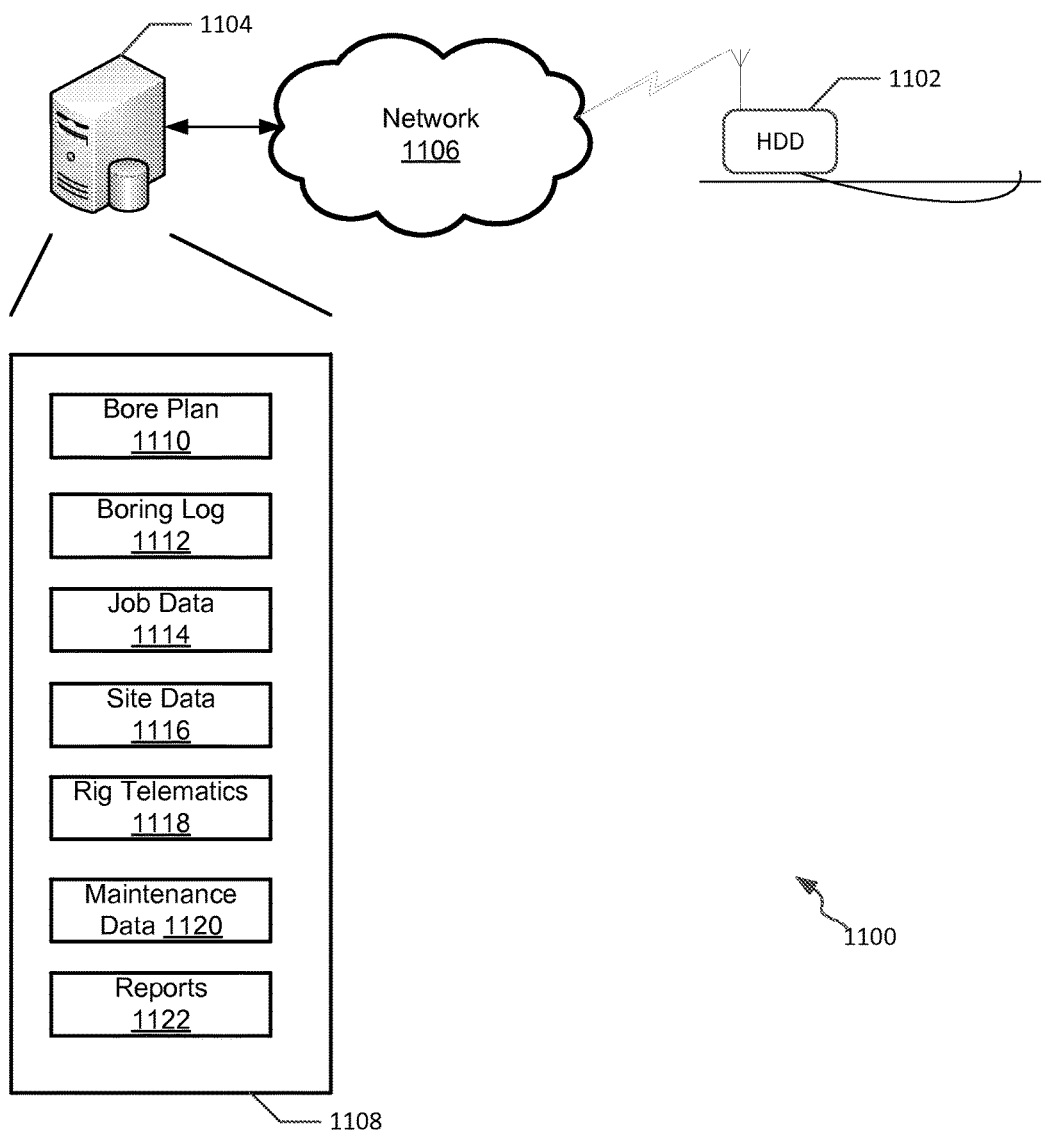
FIG. 19 is a schematic diagram of a horizontal directional drilling management system, according to an example embodiment.
Figure 20:
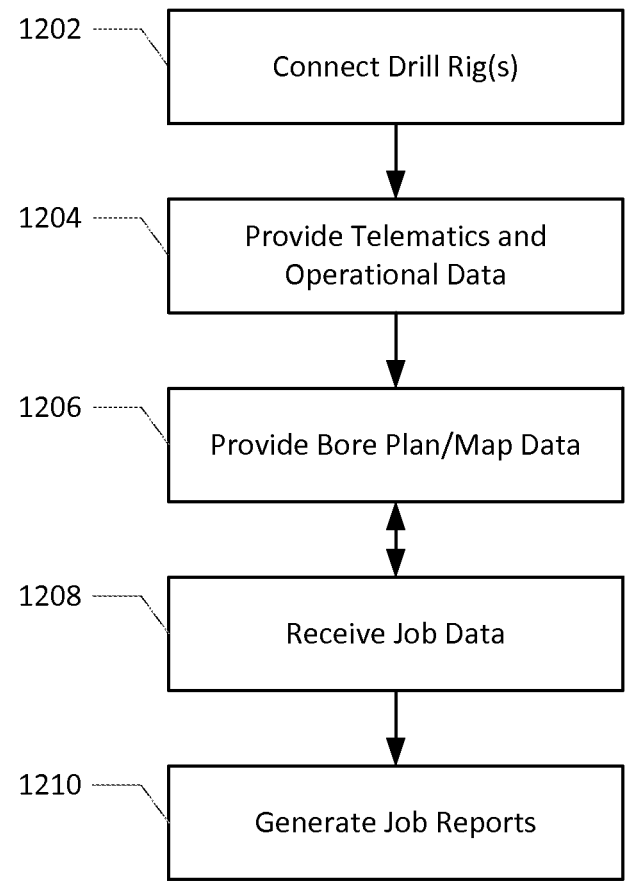
FIG. 20 is a flowchart illustrating a method by which a horizontal directional drilling operation can be performed.

Referring now to FIGS. 19-20, additional features are discussed regarding operation of an overall network including one or more HDD machines, such as machines 14, 102, 702 described above. In general, FIGS. 19-20 describe management and tracking of data captured at an HDD machine, including operational parameters of the drill rig itself, as well as location data regarding planned, current and historical locations of a sonde associated with a drill head.

As illustrated in FIG. 19, a HDD machine 1102 is communicatively connected to an HDD data server 1104 via a network 1106. The HDD machine can be any of a variety of machines, such as machines 14, 102, 702 described above. The HDD data server 1104 can be any of a variety of types of computing systems or computing resources capable of storage and retrieval of data associated with horizontal directional drilling. In various alternative embodiments, the HDD data server 1104 is either a server resource or a cloud-based, distributed computing resource available to be communicatively connected to the HDD machine 1102. The network 1106 can be any of a variety of data networks capable of providing real-time or near real-time data exchanges between the HDD data server 1104 and the HDD machine 1102, such that data is accessible by a remote computing system (e.g., system 20 of FIG. 1A).

As illustrated in FIG. 17, the HDD data server 1104 can exchange a variety of types of data with the HDD machine 1102, as well as other computing systems authorized to access such data. In the example embodiment shown, the HDD data server 1104 includes a database 1108 that is configured to store various types of information relevant to a job site. In the embodiment shown, the database 1108 includes bore plan data 1110, boring logs 1112, job data 1114, site data 1116, rig telematics data 1118, maintenance data 1120, and reports 1122; however, in alternative embodiments, other types of data could be included as well.

In the embodiment shown, bore plan data 1110 refers to data generated in advance of a boring operation, relating to a planned route for a boring tool to travel, as explained above. Example types of bore plan data are discussed, for example, in U.S. Pat. No. 6,749,029, the disclosure of which is hereby incorporated by reference in its entirety. Similarly, boring logs 1112 refer to data recorded regarding the actual path of the boring tool during a boring operation. Boring logs 1112 generally can include one or more types of location data, such as GPS coordinates or relative location data, as well as timestamps and optionally depth information, allowing a user to map a three-dimensional route of an actual bore that either is in the process of being created or has previously been created. Through use of the bore plan data 1110 and boring logs 1112, a remote computing system can also display remotely a mapped route 506 vs. an actual route 508, as was otherwise illustrated above as being displayed at an HDD machine and/or locator.

In general job data 1114 and site data 1116 correspond to data that describe a particular boring operation to be performed. Job data can include, for example, data relating to a particular job to be performed, such as specifications for the job (e.g., bore size, length, cost, timing, etc.), personnel associated with the job (e.g., the HDD machine and/or locator operator(s), project manager, or other individuals), and the specific equipment assigned to carry out the job. The specific equipment data can include the model of the HDD machine used, as well as characteristics of a locator (e.g., type of locating technology) and other components used at the job site (e.g., characteristics of the drill string, such as its bend/steering characteristics, or characteristics of other add-on modules useable with the HDD machine). Site data 1116 can include a variety of types of information describing the site at which the HDD operation takes place. For example, site data 1116 can include, among other elements, site boundary information, existing utility information, topographical information, ground composition information (e.g., soil conditions, obstacles, etc.), water table information or other analogous information. Job data 1114 and site data 1116 can be used to define a scope of and parameters surrounding a particular project, and can be used to manage timing of and expected scheduling of various HDD jobs to be performed with various pieces of equipment owned or controlled by the entity managing such data.

Rig telematics data 1118 refers to information tracked by and intended to be programmed into an HDD machine to guide and/or track its operation during an HDD operation. Example rig telematics data 1118 can include operational programming for the HDD machine as well as operational data of the HDD machine during a boring operation, for example, data collected at the HDD machine from operational subsystems of the HDD machine, as well as various components connected thereto. This can include, for example, data and dashboards relating to operation of the machine, such as engine speed, attachment speed, attachment pressure, steering position, track direction and speed, boom depth, time of day, auto-plunge status, fuel level status and fuel consumption, hydraulic oil temperature difference, track pressure, engine hours, attachment charge pressures, accumulator pre-charge pressures, engine oil pressure, engine coolant temperature, system voltage, or hydraulic oil temperature. Example telematics data is described in U.S. patent application Ser. No. 11/853,396, filed Sep. 11, 2007, the disclosure of which is hereby incorporated by reference in its entirety.

Maintenance data 1120 refers to data relating to servicing the various HDD machines in use by a particular entity. For example, maintenance data 1120 can include service records, warranty information, or other data associated with the relationship between an owner of the HDD machine and its dealer and/or manufacturer.

Reports 1122 can include any of a variety of post-job data compilations useable to assess performance of the entity performing the HDD job. Reports can include, for example, assessments of an overall cost to complete an HDD job (a particular job or averaged across jobs), or cost of ownership of an HDD machine (either a particular machine or on average across all machines associated with an entity). In some embodiments, reports 1122 can be generated either at the HDD machine or at a back-end database (e.g., HDD data server 1104), and can be generated based on collected telematics information, location information, or other information describing the machine or job. For example, drill rig pressures (e.g. oil pressure) and drilling resistance measures could be correlated with a particular sonde location, with the correlation indicating that the HDD machine was encountering a type of rock or obstacle that is difficult to bore through. Using the various reports, it is possible to further develop one or more report-based modules at the system 1100 capable of assisting with forecasting total costs and therefore advisable bid amounts for particular jobs. In some example embodiments, reports can be customized and generated at the HDD data server 1104, and exported to one or more different known software formats (e.g., a spreadsheet or web reporting format).

Referring now to FIG. 20, an example flowchart of a method 1200 for operating a horizontal directional drilling system is disclosed, in which an HDD machine 1102 is communicatively connected to remote data management components as described above. The method 1200 generally corresponds to operations that are capable of being performed remotely from the job site based on communicated data at an HDD data server 1104; however, it is recognized that one or more of the operations discussed herein could instead be performed locally at the job site.

As illustrated, the method 1000 generally includes communicatively connecting one or more drill rigs to a data collection system, such as the HDD data server 1104 of FIG. 19 (step 1202). This can include, for example, placement of the HDD machines at corresponding job sites and establishing data connectivity between the HDD machines and the HDD data server.

An operator can then cause the HDD data server 1104, either directly or via a remote computing system, to transmit data to the HDD machine 1102 in preparation for the boring operation to be performed at the job site where that HDD machine is located (step 1204). The data transmitted to the HDD machine 1102 prior to operation can include a variety of telematics dashboards or other features useable by the HDD machine to accomplish the drilling process. In various embodiments, the telematics information can be transmitted to the HDD machine 1102 in single package or in a plurality of selectable, self-contained packages. In embodiments where the telematics information is transmitted using a plurality of self-contained packages, it is possible that only a subset of those packages may be downloaded to the HDD machine 1102, as needed for operation. The data transmitted to the HDD machine 1102 prior to operation can also include various types of operational data useable by the drill rig. This can include, for example, site data and job data developed for the site can be transmitted to the HDD machine. It can also include a definition of specific equipment and/or processes to be used during the boring process associated with the job.

Additionally, before operation of the HDD machine 1102 in a boring process, a computing system may transmit bore plan and/or map data to the HDD machine (step 1206). The map data can include one or more topographical maps (two- or three-dimensional) of the area in which drilling is to occur, as well as data describing obstacles present in the area (e.g., specific rock, buildings, or underground utilities to be avoided). The bore plan data can include a proposed or planned route for boring to take place, and can be configured to be overlaid with the map data at the HDD machine (as well as at a remote system). As such, it is preferable that a common set of coordinates (e.g., GPS or other arrangement) or relative locations from a common point is used.

During operation of the HDD machine (i.e., during the boring process), the HDD data server 1104 is configured to receive HDD job data (step 1208). This includes receiving, in real-time or near real-time, updates regarding some or all of the operational parameters of the HDD machine, as well as updates regarding location and operation of the boring tool including the sonde. In varying embodiments, the HDD data server 1104 can alternatively receive a portion of the information captured at the HDD machine in realtime and a portion after completion of a job.

It is noted that, during operation of the HDD machine, in some embodiments it is possible to transmit additional or alternative bore plan or map data to the HDD machine 1102 from the HDD data server 1104 (e.g., via step 1206). For example, based on observed telemetry information received from the HDD machine 1102, it may be observed by a remote user of the overall system that a portion of the bore plan may need to be altered, for example due to a variance in the bore from an expected value, or based on other data received from the HDD machine in step 1208. In such embodiments, a map of the job site, as well as both the bore plan and actual bore location can be displayed to a user of the remote computing system via an analogous interface to that provided on the HDD machine, such as that illustrated in FIGS. 5-6.

Upon completion of the job, an HDD data server 1106 can generate one or more job reports relating to one or more completed HDD jobs. In differing embodiments, the HDD data server 1106 can either automatically generate such reports, or can be instructed to do so by a user. The reports can include, for example: a comparison between an actual boring path (e.g., an "as-built" bore) and a planned bore path; service or maintenance reports required of an HDD machine either during or after a job; alerts that have arisen during a job, such as dangerous pressure or tension levels; and cost of ownership/cost of job/cost of operation metrics. Other types of reports are possible as well, and custom reports could be defined by a user of the overall system 1100.

Referring generally to FIGS. 19-20, it is noted that although the general method 1200 is discussed with respect to a single job site and HDD machine 1102, it is recognized that the HDD data server 1104 could in many embodiments concurrently support management and storage of data relating to a plurality of different HDD machines 1102 at geographically dispersed job sites. Furthermore, it is noted that a single individual at a remote site may be able to, via the HDD data server 1104, monitor and provide guidance (e.g., bore plans or other data) to various HDD job sites concurrently, thereby allowing for real-time supervision and intervention into HDD operations as needed. As such, due to the multiple possible HDD machines that can access or provide data to/from the HDD data server, in some embodiments the system 1100 is arranged such that the HDD machine 1102 or other remote computing systems initiate data exchanges with the HDD data server 1104 as required by that remote system.

Referring now to FIGS. 1-20 generally, it is noted that in some embodiments the HDD machines described herein can be interfaced with a computing system (e.g., a server or remote system) capable of viewing and/or interacting with data obtained from or developed for use in an HDD environment. It is noted that, although the terms "server" and "remote computing system" are used in the present disclosure, it is recognized that Additionally, it is noted that the methods disclosed herein may be performed at one or more locations within an overall horizontal directional drilling environment, executed on one or more computing systems disclosed herein, or embodied as program instructions on one or more communication media, computer-readable media, or computer storage media.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. In embodiments of the present disclosure, computer storage media excludes transitory signals.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A locator system for determining a location of a drill head, comprising:
 a locating device including a global positioning system (GPS) configured to determine a location of a sonde associated with a drill head;
 a controller configured to:
  receive a first location of the sonde as determined by the locating device;
  receive a second location of the sonde subsequent to the first location as determined by the locating device;
  refine the second location based on known information associated with the drill head; and
  refine the first location based on the refined second location and the known information associated with the drill head.

2. The locator system of claim 1, wherein the controller is further configured to refine the first location based on the known information associated with the drill head.

3. The locator system of claim 1, wherein the known information associated with the drill head includes a known length of a drill string associated with the drill head.

4. The locator system of claim 1, wherein the controller is further configured to
 receive a third location of the sonde subsequent to the second location as determined by the locating device;
 refine the third location based on the known information associated with the drill head;
 further refine the second location based on the refined third location and the known information associated with the drill head; and
 further refine the first location based on the refined second and third locations and the known information associated with the drill head.

5. The locator system of claim 1, further comprising a memory accessible by the controller, wherein the controller is further configured to record the first location, the second location, the refined second location, and the refined first location in the memory.

6. The locator system of claim 1, wherein the controller is further configured to receive a bore depth associated with the first location data.

7. The locator system of claim 1, wherein the controller is further configured to receive data associated with obstacles present in a vicinity of the locator device.

8. The locator system of claim 1, further comprising a second locating device configured to sense an electromagnetic field emanating from the sonde, wherein first location received by the controller is determined by the first and second locating devices.

9. A method of determining a location of a drill head, comprising:
 determining a first location of a sonde associated with a drill head by a global positioning system (GPS) locating device;
 determining a second location of the sonde subsequent to the first location by the GPS locating device;
 refining the second location based on known information associated with the drill head; and
 refining the first location based on the refined second location and the known information associated with the drill head.

10. The method of claim 9, further comprising refining the first location based on the known information associated with the drill head.

11. The method of claim 9, wherein the known information associated with the drill head includes a known length of a drill string associated with the drill head.

12. The method of claim 9, further comprising:
determining a third location of the sonde subsequent to the second location by the GPS locating device;
refining the third location based on the known information associated with the drill head;
further refining the second location based on the refined third location and the known information associated with the drill head; and
further refining the first location based on the refined second and third locations and the known information associated with the drill head.

13. The method of claim 9, further comprising recording the first location, the second location, the refined second location, and the refined first location.

14. The method of claim 9, further comprising determining a bore depth associated with the first location data.

* * * * *